(12) United States Patent
Labuda et al.

(10) Patent No.: US 8,117,358 B2
(45) Date of Patent: Feb. 14, 2012

(54) REVENUE MANAGEMENT SYSTEM AND METHOD UTILIZING DATABASE BACKUP

(75) Inventors: David S. Labuda, Palo Alto, CA (US); Jayaprakash Krishnamoorthy, Santa Clara, CA (US); James R. Haddock, San Francisco, CA (US); Alexander S. Rockel, Hamburg (DE); Keith M. Brefczynski, Saratoga, CA (US); Giles Douglas, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1208 days.

(21) Appl. No.: 11/496,057

(22) Filed: Jul. 28, 2006

(65) Prior Publication Data

US 2007/0198283 A1   Aug. 23, 2007

Related U.S. Application Data

(60) Provisional application No. 60/703,687, filed on Jul. 28, 2005.

(51) Int. Cl.
*G06F 3/00* (2006.01)
*G07F 19/00* (2006.01)

(52) U.S. Cl. ............ 710/38; 710/36; 711/162; 705/1.1; 705/30; 705/34; 705/35; 379/114.05; 379/114.15; 379/114.2; 379/114.01; 379/15.01

(58) Field of Classification Search .................. None
See application file for complete search history.

(56) References Cited

U.S. PATENT DOCUMENTS

| | | | |
|---|---|---|---|
| 4,430,530 A | 2/1984 | Kandell et al. | 379/29.01 |
| 4,831,582 A | 5/1989 | Miller et al. | 1/1 |
| 4,849,884 A | 7/1989 | Axelrod et al. | 705/30 |
| 4,868,743 A | 9/1989 | Nishio | 1/1 |
| 4,918,593 A | 4/1990 | Huber | 1/1 |
| 4,968,873 A | 11/1990 | Dethloff et al. | 235/380 |
| 5,006,978 A | 4/1991 | Neches | 718/102 |
| 5,010,485 A | 4/1991 | Bigari | 705/17 |
| 5,036,389 A | 7/1991 | Morales | 725/24 |
| 5,043,872 A | 8/1991 | Cheng et al. | 1/1 |
| 5,163,148 A | 11/1992 | Walls | 711/162 |

(Continued)

FOREIGN PATENT DOCUMENTS

GB         63402 A1    7/1982

(Continued)

OTHER PUBLICATIONS

Agarwal et al., "Architecting Object Applications for High Performance With Relational Databases", Aug. 10, 1995, pp. 1-8.

(Continued)

*Primary Examiner* — Henry Tsai
*Assistant Examiner* — Steven Snyder
(74) *Attorney, Agent, or Firm* — Kilpatrick Townsend & Stockton LLP

(57) ABSTRACT

A real-time customer relation management system is disclosed. The system can provide increased availability, reduced internal latencies, and reduced data processing and transfer. The system can provide real time processing and batch processing. The system architecture can have an in-memory write-through cache. The cache can store data that would have otherwise been sent to a database. The system can have a backup in-memory write-through cache. The system can use a warm standby, for example, to enhance data backup efficiency.

32 Claims, 10 Drawing Sheets

U.S. PATENT DOCUMENTS

| | | | | |
|---|---|---|---|---|
| 5,212,787 A | 5/1993 | Baker et al. ............................. 1/1 |
| 5,220,501 A | 6/1993 | Lawlor et al. .................... 705/40 |
| 5,224,034 A | 6/1993 | Katz et al. .......................... 705/7 |
| 5,241,670 A | 8/1993 | Eastridge et al. ................. 714/1 |
| 5,291,583 A | 3/1994 | Bapat ........................... 717/137 |
| 5,295,256 A | 3/1994 | Bapat ........................... 717/137 |
| 5,305,389 A | 4/1994 | Palmer ......................... 382/305 |
| 5,313,664 A | 5/1994 | Sugiyama et al. ............... 705/21 |
| 5,386,413 A | 1/1995 | McAuley et al. ............. 370/392 |
| 5,426,780 A | 6/1995 | Gerull et al. .................... 707/748 |
| 5,448,623 A | 9/1995 | Wiedeman et al. ........... 455/430 |
| 5,448,727 A | 9/1995 | Annevelink ......................... 1/1 |
| 5,450,477 A | 9/1995 | Amarant et al. ........... 379/114.17 |
| 5,452,451 A | 9/1995 | Akizawa et al. ..................... 1/1 |
| 5,469,497 A | 11/1995 | Pierce et al. ............. 379/114.17 |
| 5,475,585 A | 12/1995 | Bush ............................... 705/26 |
| 5,475,838 A | 12/1995 | Fehskens et al. ............... 714/57 |
| 5,483,445 A | 1/1996 | Pickering ........................ 705/40 |
| 5,495,609 A | 2/1996 | Scott ............................ 707/696 |
| 5,499,367 A * | 3/1996 | Bamford et al. ...................... 1/1 |
| 5,499,371 A | 3/1996 | Henninger et al. ............ 717/108 |
| 5,504,885 A | 4/1996 | Alashqur ........................ 717/141 |
| 5,506,966 A | 4/1996 | Ban ............................... 719/314 |
| 5,517,555 A | 5/1996 | Amadon et al. ............... 455/408 |
| 5,523,942 A | 6/1996 | Tyler et al. ......................... 705/4 |
| 5,530,853 A | 6/1996 | Schell et al. ......................... 1/1 |
| 5,544,302 A | 8/1996 | Nguyen ......................... 715/387 |
| 5,548,749 A | 8/1996 | Kroenke ........................... 1/1 |
| 5,555,444 A | 9/1996 | Diekelman .................. 455/12.1 |
| 5,560,005 A | 9/1996 | Hoover et al. ....................... 1/1 |
| 5,579,375 A | 11/1996 | Ginter ........................... 455/417 |
| 5,590,395 A | 12/1996 | Diekelman et al. ........... 455/13.1 |
| 5,613,012 A | 3/1997 | Hoffman et al. .............. 382/115 |
| 5,615,109 A | 3/1997 | Eder ................................. 705/8 |
| 5,615,249 A | 3/1997 | Solondz ........................ 455/450 |
| 5,615,362 A | 3/1997 | Jensen et al. ......................... 1/1 |
| 5,627,979 A | 5/1997 | Chang et al. .................. 715/763 |
| 5,644,736 A | 7/1997 | Healy et al. ................... 715/784 |
| 5,649,118 A | 7/1997 | Carlisle et al. .................. 705/41 |
| 5,666,648 A | 9/1997 | Stuart ............................ 370/321 |
| 5,677,945 A | 10/1997 | Mullins et al. ............ 379/114.17 |
| 5,684,965 A | 11/1997 | Pickering ........................ 705/34 |
| 5,694,598 A | 12/1997 | Durand et al. ...................... 1/1 |
| 5,706,516 A | 1/1998 | Chang et al. .................. 719/314 |
| 5,717,924 A | 2/1998 | Kawai ................................ 1/1 |
| 5,732,400 A | 3/1998 | Mandler et al. ................. 705/26 |
| 5,737,414 A | 4/1998 | Walker et al. ................... 705/40 |
| 5,745,754 A | 4/1998 | Lagarde et al. ...................... 1/1 |
| 5,765,159 A | 6/1998 | Srinivasan ......................... 1/1 |
| 5,778,189 A | 7/1998 | Kimura et al. ................. 709/236 |
| 5,797,137 A | 8/1998 | Golshani et al. .............. 707/803 |
| 5,799,072 A | 8/1998 | Vulcan et al. ............. 379/114.02 |
| 5,799,087 A | 8/1998 | Rosen ............................. 705/69 |
| 5,806,061 A | 9/1998 | Chaudhuri et al. ................... 1/1 |
| 5,809,503 A | 9/1998 | Aoshima ............................. 1/1 |
| 5,822,747 A | 10/1998 | Graefe et al. ........................ 1/1 |
| 5,832,068 A | 11/1998 | Smith ....................... 379/114.14 |
| 5,842,220 A | 11/1998 | De Groot et al. ..................... 1/1 |
| 5,845,206 A | 12/1998 | Castiel et al. ................. 455/13.4 |
| 5,845,274 A | 12/1998 | Chadha et al. ...................... 1/1 |
| 5,850,544 A | 12/1998 | Parvathaneny et al. ....... 717/108 |
| 5,852,820 A | 12/1998 | Burrows ........................... 1/1 |
| 5,854,835 A | 12/1998 | Montgomery et al. .. 379/112.06 |
| 5,864,845 A | 1/1999 | Voorhees et al. ..................... 1/1 |
| 5,870,473 A | 2/1999 | Boesch et al. .................... 705/78 |
| 5,870,724 A | 2/1999 | Lawlor et al. .................... 705/42 |
| 5,873,093 A | 2/1999 | Williamson et al. ................. 1/1 |
| 5,875,435 A | 2/1999 | Brown ........................... 705/30 |
| 5,883,584 A | 3/1999 | Langemann et al. ..... 340/870.01 |
| 5,884,290 A | 3/1999 | Smorodinsky et al. ......... 705/44 |
| 5,893,108 A | 4/1999 | Srinivasan et al. ................... 1/1 |
| 5,898,762 A | 4/1999 | Katz .......................... 379/93.12 |
| 5,909,440 A | 6/1999 | Ferguson et al. ............. 370/389 |
| 5,913,164 A | 6/1999 | Pawa et al. .................... 455/427 |
| 5,915,253 A | 6/1999 | Christiansen ....................... 1/1 |
| 5,920,629 A | 7/1999 | Rosen ............................. 705/69 |
| 5,924,094 A | 7/1999 | Sutter ................................ 1/1 |
| 5,937,406 A | 8/1999 | Balabine et al. ..................... 1/1 |
| 5,960,416 A | 9/1999 | Block ............................. 705/34 |
| 5,963,648 A | 10/1999 | Rosen ............................. 705/67 |
| 5,966,649 A | 10/1999 | Gulliford et al. ............. 455/408 |
| 5,970,417 A | 10/1999 | Toyryla et al. ............... 455/519 |
| 5,974,407 A | 10/1999 | Sacks ................................ 1/1 |
| 5,974,441 A | 10/1999 | Rogers et al. ................ 709/200 |
| 5,974,506 A * | 10/1999 | Sicola et al. .................. 711/120 |
| 5,983,223 A | 11/1999 | Perlman ............................ 1/1 |
| 5,987,233 A | 11/1999 | Humphrey .................. 709/217 |
| 6,005,926 A | 12/1999 | Mashinsky .............. 379/114.02 |
| 6,011,795 A | 1/2000 | Varghese et al. .............. 370/392 |
| 6,012,057 A | 1/2000 | Mayer et al. ........................ 1/1 |
| 6,016,341 A | 1/2000 | Lim ......................... 379/142.01 |
| 6,021,409 A | 2/2000 | Burrows ............................ 1/1 |
| 6,032,132 A * | 2/2000 | Nelson ........................... 705/34 |
| 6,035,326 A | 3/2000 | Miles et al. .................. 709/206 |
| 6,047,067 A | 4/2000 | Rosen ............................. 705/68 |
| 6,047,267 A | 4/2000 | Owens et al. .................. 705/34 |
| 6,047,284 A | 4/2000 | Owens et al. ....................... 1/1 |
| 6,058,173 A | 5/2000 | Penfield et al. .......... 379/114.17 |
| 6,058,375 A | 5/2000 | Park ............................... 750/30 |
| 6,061,679 A | 5/2000 | Bournas et al. ..................... 1/1 |
| 6,061,763 A * | 5/2000 | Rubin et al. .................. 711/129 |
| 6,067,574 A | 5/2000 | Tzeng ........................... 709/247 |
| 6,070,051 A | 5/2000 | Astrom et al. ............... 455/12.1 |
| 6,075,796 A | 6/2000 | Katseff et al. ................. 370/466 |
| 6,078,897 A | 6/2000 | Rubin et al. ................. 705/14.39 |
| 6,092,055 A | 7/2000 | Owens et al. .................. 705/34 |
| 6,112,190 A | 8/2000 | Fletcher et al. ............. 705/36 R |
| 6,112,304 A | 8/2000 | Clawson ....................... 713/156 |
| 6,141,759 A | 10/2000 | Braddy ........................... 726/14 |
| 6,154,765 A | 11/2000 | Hart .............................. 709/201 |
| 6,170,014 B1 | 1/2001 | Darago et al. ................ 709/229 |
| 6,185,225 B1 | 2/2001 | Proctor ........................ 370/468 |
| 6,185,557 B1 | 2/2001 | Liu ................................... 1/1 |
| 6,223,172 B1 | 4/2001 | Hunter et al. ................. 707/741 |
| 6,236,972 B1 | 5/2001 | Shkedy ........................... 705/26 |
| 6,236,988 B1 | 5/2001 | Aldred ............................. 1/1 |
| 6,243,760 B1 | 6/2001 | Armbruster et al. .......... 709/243 |
| 6,266,660 B1 | 7/2001 | Liu et al. ..................... 707/769 |
| 6,311,185 B1 | 10/2001 | Markowitz et al. .................. 1/1 |
| 6,311,186 B1 | 10/2001 | MeLampy et al. .................. 1/1 |
| 6,314,365 B1 | 11/2001 | Smith ........................... 701/200 |
| 6,321,205 B1 | 11/2001 | Eder ............................. 705/7.37 |
| 6,341,272 B1 | 1/2002 | Randle ........................... 705/40 |
| 6,347,340 B1 | 2/2002 | Coelho et al. ................. 709/246 |
| 6,351,778 B1 | 2/2002 | Orton et al. ................... 719/310 |
| 6,356,897 B1 | 3/2002 | Gusack ............................ 1/1 |
| 6,377,938 B1 | 4/2002 | Block et al. ..................... 705/32 |
| 6,377,957 B1 | 4/2002 | Jeyaraman ................... 707/625 |
| 6,381,228 B1 | 4/2002 | Prieto et al. ................... 370/323 |
| 6,381,605 B1 | 4/2002 | Kothuri et al. ...................... 1/1 |
| 6,381,607 B1 | 4/2002 | Wu et al. ........................... 1/1 |
| 6,400,729 B1 | 6/2002 | Shimadoi et al. ............. 370/466 |
| 6,400,925 B1 | 6/2002 | Tirabassi et al. ............. 455/12.1 |
| 6,401,098 B1 | 6/2002 | Moulin ......................... 707/802 |
| 6,415,323 B1 | 7/2002 | McCanne et al. ............. 709/225 |
| 6,427,172 B1 | 7/2002 | Thacker et al. ............... 709/235 |
| 6,429,812 B1 | 8/2002 | Hoffberg .................... 342/357.1 |
| 6,442,652 B1 | 8/2002 | Laboy et al. .................. 711/138 |
| 6,446,068 B1 | 9/2002 | Kortge ............................. 1/1 |
| 6,477,651 B1 | 11/2002 | Teal ............................... 726/23 |
| 6,481,752 B1 | 11/2002 | DeJoseph ........................ 281/5 |
| 6,490,592 B1 | 12/2002 | St. Denis et al. ..................... 1/1 |
| 6,494,367 B1 | 12/2002 | Zacharias ..................... 235/382 |
| 6,529,915 B1 | 3/2003 | Owens et al. ....................... 1/1 |
| 6,532,283 B1 | 3/2003 | Ingram ......................... 379/130 |
| 6,553,336 B1 | 4/2003 | Johnson et al. ............... 702/188 |
| 6,563,800 B1 | 5/2003 | Salo et al. ..................... 370/264 |
| 6,564,047 B1 | 5/2003 | Steele et al. ................... 455/405 |
| 6,564,247 B1 | 5/2003 | Todorov ....................... 709/206 |
| 6,567,408 B1 | 5/2003 | Li et al. ..................... 370/395.31 |
| 6,658,415 B1 | 12/2003 | Brown ............................ 1/1 |
| 6,658,463 B1 | 12/2003 | Dillon et al. ................... 709/219 |
| 6,662,180 B1 | 12/2003 | Aref et al. .......................... 1/1 |
| 6,662,184 B1 | 12/2003 | Friedberg ..................... 707/754 |
| 6,678,675 B1 | 1/2004 | Rothrock ..................... 707/780 |
| 6,700,869 B1 | 3/2004 | Falco et al. .................... 370/230 |
| 6,725,052 B1 | 4/2004 | Raith ............................ 455/518 |

| | | | |
|---|---|---|---|
| 6,735,631 B1 | 5/2004 | Oehrke et al. | 709/226 |
| 6,901,507 B2 | 5/2005 | Wishneusky | 712/228 |
| 6,907,429 B2 | 6/2005 | Carneal et al. | 1/1 |
| 6,947,440 B2 | 9/2005 | Chatterjee et al. | 370/429 |
| 6,950,867 B1* | 9/2005 | Strohwig et al. | 709/224 |
| 6,973,057 B1 | 12/2005 | Forslow | 370/328 |
| 6,999,569 B2 | 2/2006 | Risafi et al. | 379/144.01 |
| 7,003,280 B2 | 2/2006 | Pelaez et al. | 455/406 |
| 7,058,773 B1* | 6/2006 | Frye et al. | 711/162 |
| 7,089,262 B2 | 8/2006 | Owens et al. | 1/1 |
| 7,181,537 B2 | 2/2007 | Costa-Requena et al. | 709/246 |
| 7,233,918 B1 | 6/2007 | Ye et al. | 705/30 |
| 7,246,102 B2 | 7/2007 | McDaniel et al. | 706/50 |
| 7,257,611 B1 | 8/2007 | Shankar et al. | 709/201 |
| 7,391,784 B1 | 6/2008 | Renkel | 370/401 |
| 7,395,262 B1 | 7/2008 | Rothrock | 1/1 |
| 7,406,471 B1 | 7/2008 | Shankar et al. | 1/1 |
| 7,729,925 B2* | 6/2010 | Maritzen et al. | 705/1.1 |
| 7,792,714 B1 | 9/2010 | Mills et al. | 705/35 |
| 6,041,323 A1 | 3/2011 | Kubota | 1/1 |
| 2001/0005372 A1 | 6/2001 | Cave et al. | 370/401 |
| 2001/0025273 A1* | 9/2001 | Walker et al. | 705/77 |
| 2001/0034704 A1 | 10/2001 | Farhat et al. | 705/39 |
| 2001/0056362 A1 | 12/2001 | Hanagan et al. | 705/7 |
| 2002/0059163 A1 | 5/2002 | Smith | 1/1 |
| 2002/0073082 A1* | 6/2002 | Duvillier et al. | 707/3 |
| 2002/0082881 A1 | 6/2002 | Price et al. | 705/7 |
| 2002/0087469 A1 | 7/2002 | Ganesan et al. | 705/40 |
| 2002/0106064 A1 | 8/2002 | Bekkevold et al. | 379/114.2 |
| 2003/0014361 A1 | 1/2003 | Klatt et al. | 705/40 |
| 2003/0014656 A1 | 1/2003 | Ault et al. | 726/6 |
| 2003/0061537 A1* | 3/2003 | Cha et al. | 714/16 |
| 2003/0076940 A1 | 4/2003 | Manto | 379/114.05 |
| 2003/0078456 A1* | 4/2003 | Takatori et al. | 455/456 |
| 2003/0097547 A1 | 5/2003 | Wishneusky | 712/228 |
| 2003/0105799 A1 | 6/2003 | Kahn et al. | 709/201 |
| 2003/0118039 A1 | 6/2003 | Nishi et al. | 370/401 |
| 2003/0133552 A1 | 7/2003 | Pillai et al. | 379/114.2 |
| 2003/0172145 A1 | 9/2003 | Nguyen | 709/223 |
| 2003/0202521 A1 | 10/2003 | Havinis et al. | 370/401 |
| 2003/0202638 A1 | 10/2003 | Eringis et al. | 379/15.01 |
| 2004/0002918 A1 | 1/2004 | McCarthy et al. | 705/40 |
| 2004/0018829 A1 | 1/2004 | Raman et al. | 455/404 |
| 2004/0062106 A1* | 4/2004 | Ramesh et al. | 365/202 |
| 2004/0073500 A1 | 4/2004 | Owen et al. | 705/30 |
| 2004/0132427 A1 | 7/2004 | Lee et al. | 455/406 |
| 2004/0153407 A1* | 8/2004 | Clubb et al. | 705/41 |
| 2005/0018689 A1 | 1/2005 | Chudoba | 370/395.5 |
| 2005/0026558 A1 | 2/2005 | Stura et al. | 455/3.06 |
| 2005/0033847 A1 | 2/2005 | Roy | 709/227 |
| 2005/0036487 A1 | 2/2005 | Srikrishna | 370/389 |
| 2005/0065880 A1 | 3/2005 | Amato et al. | 705/40 |
| 2005/0075957 A1* | 4/2005 | Pincus et al. | 705/35 |
| 2005/0091156 A1 | 4/2005 | Hailwood et al. | 705/40 |
| 2005/0107066 A1 | 5/2005 | Erskine et al. | 455/405 |
| 2005/0113062 A1 | 5/2005 | Pelaez et al. | 455/405 |
| 2005/0120350 A1 | 6/2005 | Ni et al. | 718/105 |
| 2005/0125305 A1 | 6/2005 | Benco et al. | 705/26 |
| 2005/0144099 A1 | 6/2005 | Deb et al. | 705/35 |
| 2005/0187841 A1 | 8/2005 | Grear et al. | 705/35 |
| 2005/0238154 A1 | 10/2005 | Heaton et al. | 379/127.01 |
| 2006/0010057 A1 | 1/2006 | Bradway et al. | 705/35 |
| 2006/0015363 A1 | 1/2006 | Allu et al. | 705/34 |
| 2006/0035637 A1 | 2/2006 | Westman | 455/435.3 |
| 2006/0045250 A1 | 3/2006 | Cai et al. | 379/126 |
| 2006/0056607 A1 | 3/2006 | Halkosaari | 379/114.12 |
| 2006/0148446 A1 | 7/2006 | Karlsson | 455/406 |
| 2006/0168303 A1 | 7/2006 | Oyama et al. | 709/231 |
| 2006/0190478 A1 | 8/2006 | Owens et al. | 1/1 |
| 2006/0248010 A1 | 11/2006 | Krishnamoorthy et al. | 705/40 |
| 2006/0251226 A1 | 11/2006 | Hogan et al. | 379/114.15 |
| 2007/0091874 A1 | 4/2007 | Rockel | 370/352 |
| 2007/0100981 A1 | 5/2007 | Adamczyk et al. | 709/223 |
| 2007/0110083 A1 | 5/2007 | Krishnamoorthy et al. | 370/401 |
| 2007/0133575 A1 | 6/2007 | Cai et al. | 370/401 |
| 2007/0198283 A1 | 8/2007 | Labuda | 705/1.1 |
| 2007/0288367 A1 | 12/2007 | Krishnamoorthy et al. | 705/40 |
| 2007/0288368 A1 | 12/2007 | Krishnamoorthy et al. | 705/40 |
| 2008/0033873 A1 | 2/2008 | Krishnamoorthy et al. | 705/40 |
| 2008/0033874 A1 | 2/2008 | Krishnamoorthy et al. | 705/40 |
| 2008/0040267 A1 | 2/2008 | Krishnamoorthy et al. | 705/40 |
| 2008/0126230 A1 | 5/2008 | Bellora et al. | 705/32 |
| 2008/0215474 A1* | 9/2008 | Graham | 705/37 |
| 2008/0311883 A1 | 12/2008 | Bellora et al. | 455/406 |

FOREIGN PATENT DOCUMENTS

| | | |
|---|---|---|
| WO | WO 95/04960 A2 | 2/1995 |
| WO | WO 95/27255 A1 | 10/1995 |
| WO | WO 96/34350 A1 | 10/1996 |
| WO | WO 97/03406 A1 | 1/1997 |
| WO | WO 98/52131 A1 | 11/1998 |
| WO | WO 2007/002841 A2 | 1/2007 |
| WO | WO 2007/016412 A2 | 2/2007 |

OTHER PUBLICATIONS

Black, "Real-Time Fraud Management", Billing World, Jul./Aug. 1999; pp. 3.

Blaha, Michael R. et al., "Relational Database Design Using an Object Oriented Methodology", Communication of the ACM, Apr. 1988, vol. 31, No. 4, pp. 414-427.

Borland's Paradox for Windows User Guide, Version 5.0, Borland International, Inc., 1994, 185 pages.

Chenho, Kung, "Object Subclass Hierarchy in SQL: A Simple Approach", Jul. 1990, Communications of the ACM, vol. 33, No. 7, pp. 117-125.

Chester, Thomas et al., Mastering Excel 97, 4th Ed., Sybex Inc., Alameda, CA, 1997, 200 pages.

Davis, Charles, "Online Financing to Boost Procurement", Electronic Payments International, p. 14, Feb. 2000, 3 pages total.

Derfler, Frank J. et al., "How Networks Work", Millenium Ed., Que Corporation, Jan. 2000, 249 pages (2 pdf attachments).

Gavron, Jacquelyn et al., "How to Use Microsoft Windows NT 4 Workstation", MacMillan Computer Publishing, USA, 1996, 25 pages.

Gomez-Perez et al., "Towards a Method to Conceptualize Domain Ontologies", Workshop on Ontological Engineering, ECAI' 96, Budapest, Aug. 12, 1996, pp. 41-51.

Gralla, Preston, "How the Internet Works", Millenium Ed., Que Corporation, Aug. 1999, 357 pages (2 pdf attachments).

Horngren, Charles T. et al., "Introduction to Financial Accounting", Revised 3rd Ed., Prentice-Hall, Inc., 1988, 561 pages.

Iannella et al., "Metadata: Enabling the Internet", Jan. 1997, Research Data Network CRC, pp. 1-7.

Muller, Nathan J., "Desktop Encyclopedia of the Internet", Artech House, Inc., 1998, 602 pgs (2 pdf attachments).

Peachtree, "Using General Ledger User Guide", Peachtree Software, Inc., 1989, 319 pages.

St. Pierre et al., "Issues in Crosswalking Content Metadata Standasrds", Oct. 15, 1998, National Information Standards Organization, pp. 1-8.

PR Newswire, "Regions to Offer Secure Internet Banking from Security First Technologies", Apr. 3, 1997, p. 0403ATTH003, 3 pgs.

Reinwald et al., "Storing and Using Objects in a Relational Database", IBM Systems Journal, vol. 35, No. 2, May 1996, pp. 172-191.

Riley, David D., "Data Abstraction and Structures: An Introduction to Computer Science II", Boyd and Fraser Publishing Company, 1987, 30 pages.

Search Report and Written Opinion for Application PCT/US06/29571, mailed on Apr. 16, 2007; 10 pages.

Search Report for Application PCT/US06/25405, mailed on Apr. 3, 2008, 2 pages.

Shah, Ashwin V. et al., "DSM: An Object-Relationship Modeling Language", OOPSLA '89, Oct. 1-6, 1989, pp. 181-202.

Syverson, Nancy, "Inside Graybar: A Profile of the Nation's Top Electrical Distributor", Industrial Maintenance and Plant Operation, vol. 61, No. 11, p. 14, Nov. 2000, 4 pages total.

U.S. Appl. No. 09/569,097, filed May 10, 2000, Advisory Action mailed May 11, 2009, 3 pages.

U.S. Appl. No. 09/569,097, filed May 10, 2000, Advisory Action mailed May 6, 2008, 3 pages.

U.S. Appl. No. 09/569,097, filed May 10, 2000, Advisory Action mailed Jun. 24, 2004, 2 pages.

U.S. Appl. No. 09/569,097, filed May 10, 2000, Final Office Action mailed Jan. 28, 2004, 8 pages.
U.S. Appl. No. 09/569,097, filed May 10, 2000, Final Office Action mailed Feb. 11, 2008, 6 pages.
U.S. Appl. No. 09/569,097, filed May 10, 2000, Final Office Action mailed Mar. 4, 2009, 8 pages.
U.S. Appl. No. 09/569,097, filed May 10, 2000, Final Office Action mailed Jun. 16, 2005, 16 pages.
U.S. Appl. No. 09/569,097, filed May 10, 2000, Notice of Allowance mailed Mar. 5, 2010, 9 pages.
U.S. Appl. No. 09/569,097, filed May 10, 2000, Office Action mailed Oct. 7, 2002, 6 pages.
U.S. Appl. No. 09/569,097, filed May 10, 2000, Office Action mailed Oct. 7, 2004, 12 pages.
U.S. Appl. No. 09/569,097, filed May 10, 2000, Office Action mailed Jul. 3, 2003, 7 pages.
U.S. Appl. No. 09/569,097, filed May 10, 2000, Office Action mailed Aug. 9, 2007, 8 pages.
U.S. Appl. No. 09/569,097, filed May 10, 2000, Office Action mailed Sep. 1, 2009, 6 pages.
U.S. Appl. No. 09/569,097, filed May 10, 2000, Office Action mailed Sep. 3, 2008, 6 pages.
U.S. Appl. No. 11/414,072, filed Apr. 27, 2006, Advisory Action mailed Jan. 9, 2009, 3 pages.
U.S. Appl. No. 11/414,072, filed Apr. 27, 2006, Advisory Action mailed Dec. 28, 2009, 3 pages.
U.S. Appl. No. 11/414,072, filed Apr. 27, 2006, Final Office Action mailed Oct. 16, 2009, 19 pages.
U.S. Appl. No. 11/414,072, filed Apr. 27, 2006, Final Office Action mailed Oct. 23, 2008, 21 pages.
U.S. Appl. No. 11/414,072, filed Apr. 27, 2006, Office Action mailed Mar. 24, 2009, 16 pages.
U.S. Appl. No. 11/414,072, filed Apr. 27, 2006, Office Action mailed Apr. 24, 2008, 33 pages.
U.S. Appl. No. 11/415,759, filed May 1, 2006, Office Action mailed Mar. 30, 2010, 9 pages.
U.S. Appl. No. 11/559,969, filed Nov. 15, 2006, Office Action mailed Oct. 2, 2009, 11 pages.
U.S. Appl. No. 11/559,969, filed Nov. 15, 2006, Office Action mailed Mar. 31, 2010, 13 pages.
U.S. Appl. No. 11/559,969, filed Nov. 15, 2006, Office Action mailed Mar. 5, 2009, 11 pages.
U.S. Appl. No. 11/760,427, filed Jun. 8, 2007, Office Action mailed Dec. 11, 2009, 13 pages.
U.S. Appl. No. 11/760,519, filed Jun. 8, 2007, Office Action mailed Jan. 21, 2010, 9 pages.
White, Ron, "How Computers Work", Millenium Ed., Que Corporation, Sep. 1999, 322 pages (2 pdf attachments).
ORACLE Applications, Concepts, Release 11 for Unix, Apr. 1998, 90 pgs.
ORACLE Server Distribution Systems, vol. II: Replicated Data, Release 7.3, Feb. 1996, 469 pgs.
Skold, Martin, "QDB—A Query Processor for the High Performance, Parallel Data Server NDB Cluster", Linkopings University, Sweden, Apr. 1999, 28 pgs.
U.S. Appl. No. 09/967,493, filed Sep. 27, 2001, Office Action mailed Jan. 14, 2004, 15 pages.
U.S. Appl. No. 09/967,493, filed Sep. 27, 2001, Office Action mailed Dec. 2, 2004, 22 pages.
U.S. Appl. No. 09/967,493, filed Sep. 27, 2001, Final Office Action mailed Aug. 19, 2005, 23 pages.
U.S. Appl. No. 09/967,493, filed Sep. 27, 2001, Office Action mailed May 16, 2006, 26 pages.
U.S. Appl. No. 09/967,493, filed Sep. 27, 2001, Petition Decision mailed Dec. 18, 2006, 1 page.
U.S. Appl. No. 09/967,493, filed Sep. 27, 2001, Final Office Action mailed Dec. 19, 2006, 33 pages.
U.S. Appl. No. 09/967,493, filed Sep. 27, 2001, Office Action mailed Sep. 11, 2007, 15 pages.
U.S. Appl. No. 09/967,493, filed Sep. 27, 2001, Notice of Allowance mailed Apr. 11, 2008, 12 pages.
U.S. Appl. No. 10/394,409, filed Mar. 21, 2003, Office Action mailed Sep. 1, 2006, 9 pages.
U.S. Appl. No. 10/394,409, filed Mar. 21, 2003, Final Office Action mailed Feb. 22, 2007, 13 pages.
U.S. Appl. No. 10/394,409, filed Mar. 21, 2003, Advisory Action mailed May 2, 2007, 3 pages.
U.S. Appl. No. 10/394,409, filed Mar. 21, 2003, Office Action mailed Aug. 3, 2007, 11 pages.
U.S. Appl. No. 10/394,409, filed Mar. 21, 2003, Office Action mailed Feb. 21, 2008, 21 pages.
U.S. Appl. No. 10/394,409, filed Mar. 21, 2003, Final Office Action mailed Sep. 29, 2008, 19 pages.
U.S. Appl. No. 10/394,409, filed Mar. 21, 2003, Advisory Action mailed Jan. 23, 2009, 3 pages.
U.S. Appl. No. 10/394,409, filed Mar. 21, 2003, Office Action mailed Mar. 4, 2009, 13 pages.
U.S. Appl. No. 10/394,409, filed Mar. 21, 2003, Final Office Action mailed Aug. 19, 2009, 11 pages.
U.S. Appl. No. 10/394,409, filed Mar. 21, 2003, Advisory Action mailed Oct. 23, 2009, 3 pages.
U.S. Appl. No. 10/375,694, filed Feb. 26, 2003, Office Action mailed Sep. 7, 2004, 12 pages.
U.S. Appl. No. 10/375,694, filed Feb. 26, 2003, Final Office Action mailed May 13, 2005, 13 pages.
U.S. Appl. No. 10/375,694, filed Feb. 26, 2003, Office Action mailed Oct. 13, 2005, 9 pages.
U.S. Appl. No. 10/375,694, filed Feb. 26, 2003, Notice of Allowance mailed Apr. 3, 2006, 4 pages.
U.S. Appl. No. 10/706,151, filed Feb. 26, 2003, Office Action mailed Oct. 20, 2004, 4 pages.
U.S. Appl. No. 10/706,151, filed Feb. 26, 2003, Final Office Action mailed May 13, 2005, 6 pages.
U.S. Appl. No. 10/706,151, filed Feb. 26, 2003, Office Action mailed Sep. 16, 2005, 7 pages.
U.S. Appl. No. 10/706,151, filed Feb. 26, 2003, Final Office Action mailed Mar. 23, 2006, 9 pages.
U.S. Appl. No. 10/706,151, filed Feb. 26, 2003, Office Action mailed Oct. 10, 2007, 5 pages.
U.S. Appl. No. 10/706,151, filed Feb. 26, 2003, Notice of Allowance mailed Apr. 18, 2008, 8 pages.
U.S. Appl. No. 09/562,785, filed May 2, 2000, Office Action mailed Feb. 17, 2004, 10 pages.
U.S. Appl. No. 09/562,785, filed May 2, 2000, Final Office Action mailed Sep. 27, 2004, 18 pages.
U.S. Appl. No. 09/562,785, filed May 2, 2000, Office Action mailed Jul. 25, 2006, 18 pages.
U.S. Appl. No. 09/562,785, filed May 2, 2000, Final Office Action mailed Jan. 11, 2007, 17 pages.
U.S. Appl. No. 09/562,785, filed May 2, 2000, Advisory Action mailed Mar. 26, 2007, 3 pages.
U.S. Appl. No. 09/562,785, filed May 2, 2000, Notice of Allowance mailed May 21, 2007, 7 pages.
U.S. Appl. No. 09/617,590, filed Jul. 18, 2000, Office Action mailed Feb. 17, 2004, 10 pages.
U.S. Appl. No. 09/617,590, filed Jul. 18, 2000, Office Action mailed Nov. 16, 2004, 11 pages.
U.S. Appl. No. 09/617,590, filed Jul. 18, 2000, Final Office Action mailed Jun. 14, 2005, 10 pages.
U.S. Appl. No. 09/617,590, filed Jul. 18, 2000, Office Action mailed Jul. 25, 2006, 9 pages.
U.S. Appl. No. 09/617,590, filed Jul. 18, 2000, Office Action mailed Sep. 27, 2006, 9 pages.
U.S. Appl. No. 09/617,590, filed Jul. 18, 2000, Notice of Allowance mailed Mar. 27, 2007, 10 pages.
U.S. Appl. No. 11/478,558, filed Jun. 28, 2006, Office Action mailed Oct. 21, 2010, 12 pages.
U.S. Appl. No. 11/760,427, filed Jun. 8, 2007, Advisory Action mailed Aug. 30, 2010, 3 pages.
U.S. Appl. No. 11/760,427, filed Jun. 8, 2007, Final Office Action mailed Jun. 25, 2010, 13 pages.
U.S. Appl. No. 11/760,519, filed Jun. 8, 2007, Final Office Action mailed Jul. 26, 2010, 15 pages.
U.S. Appl. No. 11/415,759, filed May 1, 2006, Final Office Action mailed Nov. 17, 2010, 9 pages.

U.S. Appl. No. 11/760,472, filed Jun. 8, 2007, Office Action mailed Mar. 24, 2011, 7 pages.
U.S. Appl. No. 11/760,493, filed Jun. 8, 2007, Office Action mailed Mar. 30, 2011, 9 pages.
U.S. Appl. No. 11/760,505, filed Jun. 8, 2007, Office Action mailed Apr. 4, 2011, 7 pages.
Fiore, M., et al., "Oracle Applications Concepts, Release 11 for UNIX," Oracle Corporation, 1998, 90 pgs.

U.S. Appl. No. 11/415,759, filed May 1, 2006, Advisory Action mailed Jan. 26, 2011, 3 pages.
U.S. Appl. No. 11/478,558, filed Jun. 28, 2006, Final Office Action mailed May 19, 2011, 15 pages.
U.S. Appl. No. 11/760,427, filed Jun. 8, 2007, Office Action mailed Apr. 8, 2011, 19 pages.

* cited by examiner

REVENUE MANAGEMENT SYSTEM AND METHOD UTILIZING DATABASE BACKUP

CROSS-REFERENCE TO RELATED APPLICATIONS

This application claims the benefit of U.S. Provisional Application No. 60/703,687 filed 28 July 2005 which is herein incorporated by reference in its entirety.

BACKGROUND OF THE INVENTION

This invention relates to a revenue management system that has an in-memory write-through cache.

Prepaid phone accounts are tracked in real-time by billing and time management hardware and software architectures in communication with the phone network switch. The architecture approves the customer's call if there are sufficient funds in the customer's prepaid account. If the customer runs out of time on his prepaid account during a call, the architecture acts to terminate the call.

These architectures are known as customer relation management (CRM) systems. CRM systems are also used for non-prepaid scenarios, such as for generating bills. CRM systems are also used for other telecommunications, and other network management scenarios.

Prepaid account CRM systems need to have the ability to track accounts in real-time. Available real-time architectures for managing prepaid customer accounts have some existing limitations.

First, the available architectures require high performance and data throughput, thereby leading to relatively high hardware requirements. These architectures, along with their storage and maintenance can be expensive and time-consuming.

Second, requirements for very low system response latencies are difficult to achieve. Transactions in existing architectures involve several round-trips-to the disk-based storage subsystem. The data must be processed by a comparatively large software stack to transform from a relational representation into a physical storage format.

Third, in an available architecture, the data is transferred several times from component to component of the system to retrieve the data, map it from a relational format to an object format, process it with the desired business logic, and then transfer the response to the client.

Fourth, currently available architectures can not provide desired levels of data availability to the public phone network (e.g., the switch). The close connection of a prepaid CRM system to the public network increases the data availability requirements. Being part of the public network, some parts of the system need to have carrier-grade availability.

Also, no single product accomplished both batch processing and real-time processing for telecommunications CRM (e.g., billing) purposes.

BRIEF SUMMARY OF THE INVENTION

A system and method for managing any numerical account information is disclosed. For example, the system and method can be used for managing revenue for telecommunications system. The system and method can be used to manage account balances, such as user accounts for the telecommunications system. Management of account balances can include altering the balance of the account during use, and/or querying the account (e.g., by the account holder or a customer service representative), and/or querying the account to produce a billing statement or perform other accounting features, and/or querying the account to determine whether to authorize use of the account.

The system can be used with an account with an existing balance (e.g., prepaid), an account with a maximum use limit (e.g., capped), a current payment account (e.g., now-pay, for example through the use of a credit card), other types of balance management accounts, or combinations thereof.

The system architecture can be configured to increase performance, and availability and decrease latency. The system and method can manage accounts, for example, for the prepaid wireless markets handling services such as GSM, GPRS and SMS.

The system can have a rating engine, a billing engine, and a first, high-speed, memory (e.g., transaction in memory object store (TIMOS)). The first memory can be a virtual database cache. The first memory can be a typical on-board RAM storage location.

The first memory can be a smart cache. The smart cache can treat different object types different ways. For example, the smart cache can treat reference objects, database-only objects, and transient object differently.

Reference objects can be owned by the database and never updated by the first memory. Reference objects can include dynamic reference objects (e.g., an account balance) that change each call, and static reference objects (e.g., the billing rate for different types of calls) that never or rarely change. Database-only objects can be objects that change one-time or rarely during the call and are not referred to by the connection manager. Transient objects can exist, for example, only in-memory (e.g., in TIMOS). Transient objects can be unwritten to the database. Transient objects can be written to the database, for example, at the end of the call (e.g., credit balance).

The database can have a data dictionary. The data dictionary can by written by the users. The data dictionary can define an object type and what type of object each other is. Customers can edit the data dictionary if so desired.

The new revenue management system can have a high availability. The system can have a warm standby operation by referring to any data remaining in TIMOS. During warm standby, in the case of a loss of data, the system can recreate data from the switch and/or TIMOS when the switch sends re-authorization data (e.g., during long calls) or end-of-call data.

A known failure protection scheme with a high availability (monitor) regularly checking the status of the control manager, TIMOS, data manager, the database manager, and the database is also disclosed.

A self-container failure protection system is disclosed. Each component of the system can check on the status of its immediately downstream component. If the downstream component has failed, or is passing along a failure message regarding a further downstream component failure, the system can take appropriate action, including alerting a user.

DETAILED DESCRIPTION

A computer-based system and method for managing any numerical account information is disclosed. For example, the system and method can be used for managing revenue for telecommunications system. The system and method can be used to manage account balances, such as user accounts for the telecommunications system. The management of account balances can include altering the balance of the account during use, and/or querying the account (e.g., by the account holder or a customer service representative), and/or querying the account to produce a billing statement or perform other accounting features, and/or querying the account to determine whether to authorize use of the account.

Figure 1:
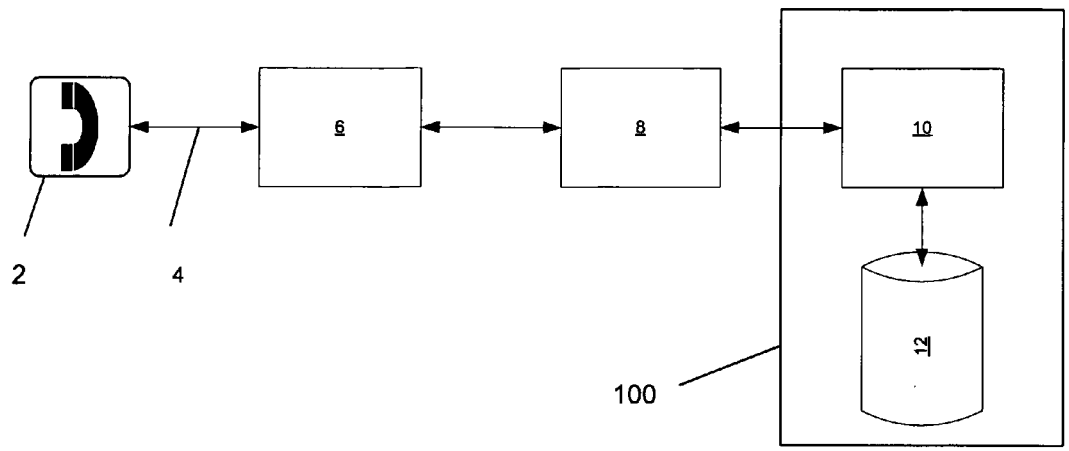
FIG. 1 illustrates a variation of the revenue management system architecture connected to a switch over a network.

FIG. 1 illustrates a telecommunication device 2, such as a phone, computer, or fax machine, that can be connected through a public telephone network 4 to a switch 6. The telecommunication device 2 can be communicating with a second telecommunication device through the switch 6. The switch 6 can communicate across a network and through a gateway 8 (e.g., having a protocol translator) to the revenue management system 100. The gateway 8 can communicate directly with a business logic module 10 or business logic application (e.g., Portal Infranet, Portal Software, Inc. Cupertino, Calif.). The business logic module 10 can communicate with a database system 12 to determine whether the telecommunication device 2 connected to the switch 6 has permission to connect and/or stay on the line. The database system 12 can have a highly-available Oracle RAC database cluster. The system 100 can utilize Oracle transaction management functionality.

Figure 2:
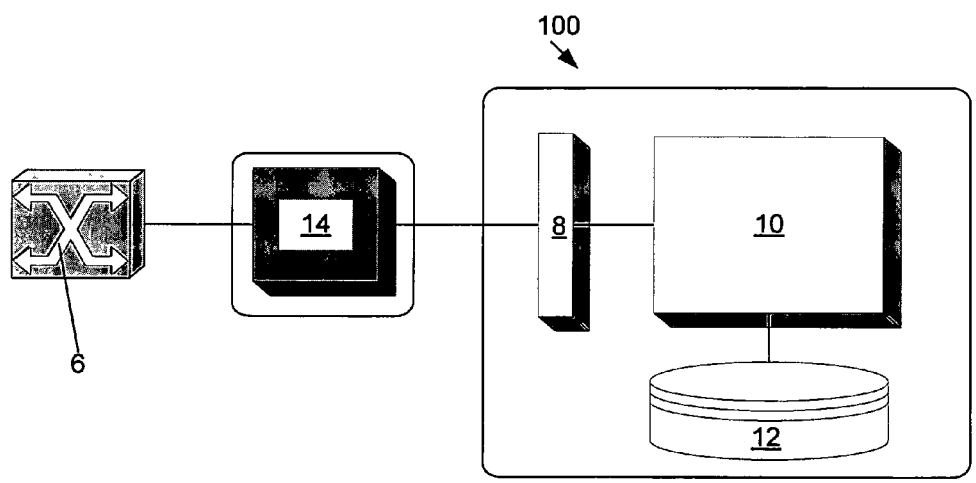
FIG. 2 illustrates a variation of the revenue management system architecture connected to a switch over a public network.

FIG. 2 illustrates that the gateway 8 can be a part of the revenue management system 100. The gateway 8 can interface between the business logic module 10 and an intelligent network (IN) service control point system (SCP) 14. The service control point system 14 can facilitate communication between the switch 6 and the gateway 8. The SCP system 14 can be-software or a remote computer database within the network that receives queries, for example from service switching points (SSP), in order to process applications, such as 800 and LNP number lookups and calling card verification. The SCP system 14 can process the applications utilizing the customer management system 100. The gateway 8 can be a high-speed protocol translator from the IN SCP to the remainder of the revenue management system 100.

Figure 3:
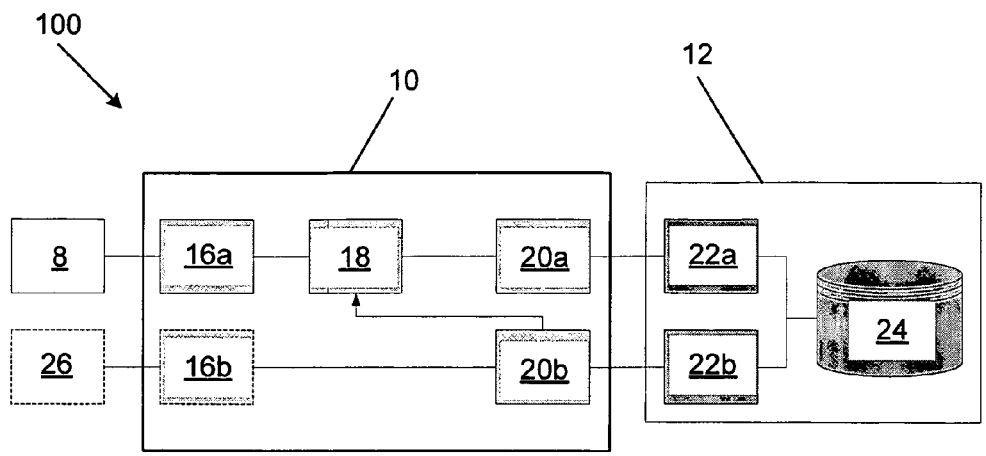
FIGS. 3 through 5 illustrate variations of the revenue management system architecture.

FIG. 3 illustrates that the business logic module 10 can have one or more rating connection managers (CM) 16a and 16b, a first memory data manager 18 (e.g., TIMOS Data Manager (DMT) from Portal Software, Inc.), and one or more second memory data managers 20a and 20b (e.g., Oracle Data Manager (DM Oracle). The second memory data managers 20a and 20b can communicate with the database system 12 or other second memory system. The database system 12 can have one or more database clusters 22a and 22b (e.g., Oracle Real Application Clusters), for example, providing high availability and scalability for databases running on the cluster. The database clusters 22a and 22b can support one or more databases 24.

The business logic module can be accessed via the gateway 8 and/or via a manual access application 26. The manual access application 26 can be operated manually or automatically. The manual access application 26 can be configured, for example, to be used by billing software to generate invoices, and/or by a customer service representative to check on account status, and/or by the account-holder to check account status.

The revenue management system 100 can have a first memory (e.g., TIMOS) and a second memory (e.g., database). The first memory can be, for example, in and/or in communication with the first memory data manager 18. The first memory can be configured to have faster, slower, and/or the same read, and/or write, and/or re-write speeds (e.g., access speeds) as the second memory. The first memory can be an in-memory data store and database cache dedicated to high-speed rating and authorization requirements.

The first memory can be solid state memory, such as system memory (e.g., RAM) or one or more hard drives, for example with fast access speeds. Requests for data in the first memory can be processed faster than requests for data in a second memory.

The first data in a first data object can be stored in the first memory in the format used by the business logic module 10 (e.g., Portal Infranet, Portal Software, Inc.). The first data can be left untranslated before storage in the first memory. The internal search and storage algorithms can be optimized for in-first-memory data. Storing the first data in the first memory can, for example, eliminate the round trip to the second memory (e.g., one or more databases, such as on database servers), and can speed the process of storing, editing and/or querying the first data. Object creation or updates for the first data objects can require no access of the second memory. Updates for the first data objects can be performed in the first memory. The system can have, for example, a reduced throughput and/or latency.

The first memory data objects (e.g., transient objects) can be stored in the first memory and/or the second memory. For example, the first memory data objects can be stored not in the database and not be persisted in the first memory. The first memory objects can, for example, exist only in the process heap memory of the first memory. The first memory objects can be, for example, managed in a transactional manner (e.g., like the other memory objects).

First memory data objects can be removed from the first memory by shutdown of the first memory or the business logic executing a delete operation on the first memory data object. The store for first memory data objects can be a fixed size, for example, determined during startup of the first memory process.

The first memory data manager 18 can be configured to improve access times and latency on moving and/or writing and/or editing and/or deleting and/or querying objects.

The second memory can be in and/or in communication with the second memory data manager 20. Requests for second memory data objects can be sent to the second memory data manager 20. The second memory, for example, can be a disk-based (e.g., on one or more hard drives) database. The database can be a relational database (RDBMS).

The system can have low access second memory data objects (e.g., database-only objects). The low access second memory data objects can be stored primarily and/or exclusively in the second memory (e.g., one or more databases).

The low access second memory data objects can be stored in the first memory none of the time, or some of the time.

The first memory data manager can access the low access second memory data object type via a pass-through mode. For example, requests can be forwarded to the second memory data manager (e.g., DM-Oracle), and responses can be forwarded back to the first memory data manager.

The high access second memory data objects (e.g., reference objects) can be updated seldom and not during high-speed session processing. The high access second memory data objects can be stored (cached) in a first memory reference object cache (ROC). The high access second memory data objects can grow in number in relation to growth in the subscriber base.

The high access second memory data objects can exist in the first memory an equal amount of time as length of the first memory process. A newly started first memory instance can contain no high access second memory data objects.

Updating and creating high access second memory data objects can be performed in the second memory and in the first memory in the high access second memory data objects can be updated or created asynchronously or synchronously in the second memory and the first memory.

The high access second memory data objects can be static or dynamic. The static high access second memory data objects can be queried, updated, created, or deleted at irregular intervals. The static high access second memory data objects can be, for example, subscriber information such as the list of subscribed services and the chosen tariff plans.

The dynamic high access second memory data objects can be touched (e.g., queried, updated, created, deleted) after the completion of each session. The dynamic high access second memory data objects can be, for example, the monetary and non-monetary balances belonging to a subscriber account.

A standby-first memory (e.g., for a high availability variation that can have an active first memory and a backup, standby first memory) can preload the static high access second memory data objects. Changes of static reference objects can be propagated from the active first memory to the standby first memory.

The gateway 8 can directly communicate with the business logic module 10. For example, during a customer's use of the telecommunication network, the gateway 8 can communicate with a first connection manager (CM) 16a. The gateway 8 can pass requests to the CM 16a, for example, calling the appropriate business logic routines depending on the type of request that is indicated from the IN SCP 14. The gateway 8 can be nearly stateless. The gateway 8 can provide fast failover capabilities, for example, accompanied by a degraded mode of operation that is used when the lower architecture layers become unavailable. The gateway 8 can perform authentication, authorization and accounting procedures.

Events received by the CM can be rated via an embedded rating engine using the data provided from the first memory data manager 18 (e.g., DM TIMOS cache) and the database system 12. The rating engine can produce rates for customer use of the telecommunications network under the specific conditions that apply (e.g., time of day, day of week, network used). The rating engine can cache pricing objects itself, for example, in order to reduce the number of network roundtrips necessary to complete the rating phase. The rating engine can perform zoning and discounting rating.

Based on the object type, the first memory data manager 18 can pass the request to the database system 12, query the first memory data manager 18 reference object cache or accesses the first memory (e.g., in-memory store) for transient objects.

The object types and their locations can be defined in a business logic database (e.g., Infranet Data Dictionary by Portal Software, Inc.), which can be in the database system 12. Traffic for objects not in the first memory can be allowed to bypass the by accessing the database manager 20, for example, in the same way a commonly used system without the first data manager would be configured. The data integrity of the first memory can be ensured by a platform-managed synchronization mechanism that can propagate the necessary updates to the first memory. The first memory can have one or more caches.

Figure 4A:
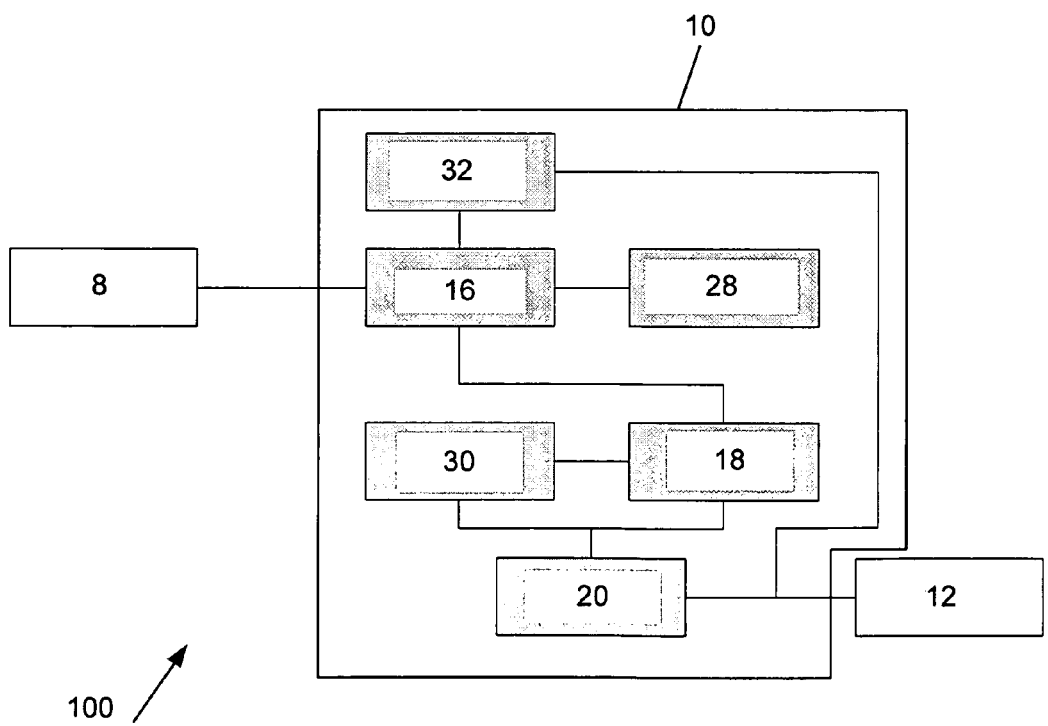
Figure 4B:
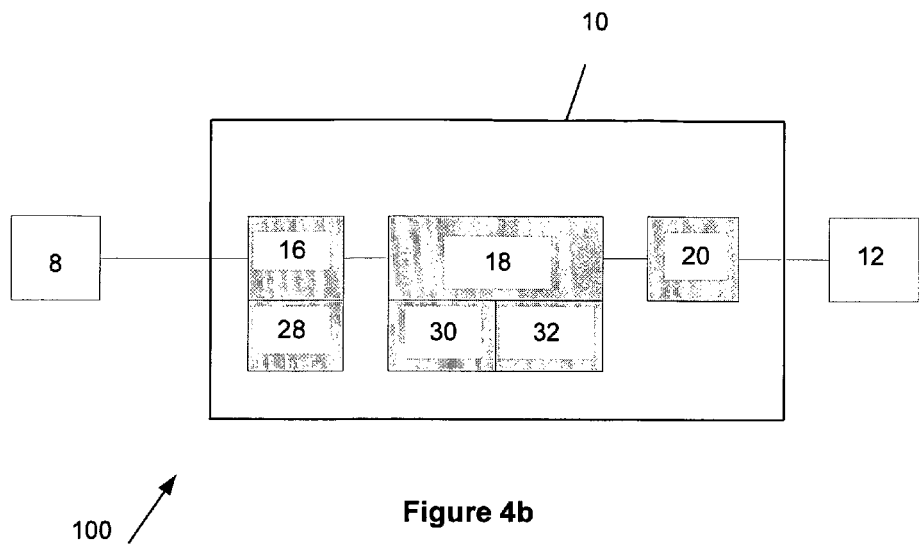

FIGS. 4a and 4b illustrate variations of the revenue management system 100. The gateway 8 can act as a high-speed protocol translator as well as an SLA monitor with fallback capabilities. The CM 16 can receive requests from the gateway 8. The CM 16 can have the authorization, authentication and accounting business logic (e.g., for delivery to the gateway 8). The CM 16 can call operational codes on the first data manager 18. The CM 16 can be replaced with another client, such as a migration tool. The CM 16 can have a realtime pipeline (RTP) 28. The RTP 28 can be configured to adjust the rating, for example by discounting and zoning the rate. The RTP 28 can be optionally used by the CM 16 while rating.

The first data manager 18 can have a data migratory subsystem 30. The data manager subsystem 30 can be used to fill the high access second memory object cache after start or fail over.

The first data manager 18 can have a directory server 32. The directory server 32 can be configured to identify the correct first memory/second memory combinations in scaled scenarios with more second memory instances than first memory instances or more first memory instances than second memory instances. The directory server 32 can enable the gateway instances and CM instances to be independent of the number of first memory instances. The number and location of gateway and CM processes can be flexibility and scalability with respect to the number and location of first memory instances.

FIG. 4a shows that the elements of the architecture of the business logic module can all be standalone. FIG. 4b illustrates that the numerous elements of the architecture can be integrated.

Figure 5:
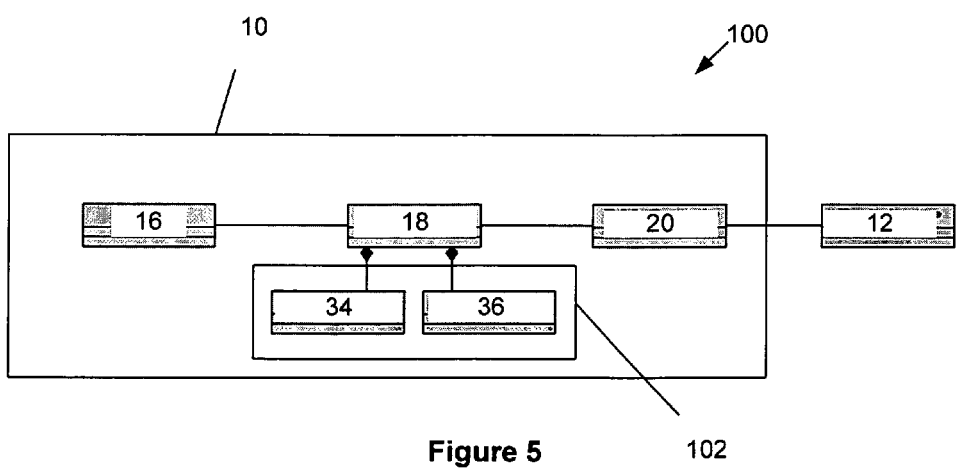

FIG. 5 illustrates that the first memory 102 can have a reference object cache (ROC) 34 and a transient object store (TOC) 36. The ROC 34 can be managed by a separate set of rules than the TOC 36. The ROC 34 and the TOC 36 can be in the same or different parts of the first memory 102. The first memory 102 can be part of, or separate but in communication with, the first memory data manager 18. The ROC 34 can be configured to cache high access second memory data objects (e.g., reference objects). The TOC 36 can be configured to store first memory data objects (e.g., transient objects).

Figure 6:
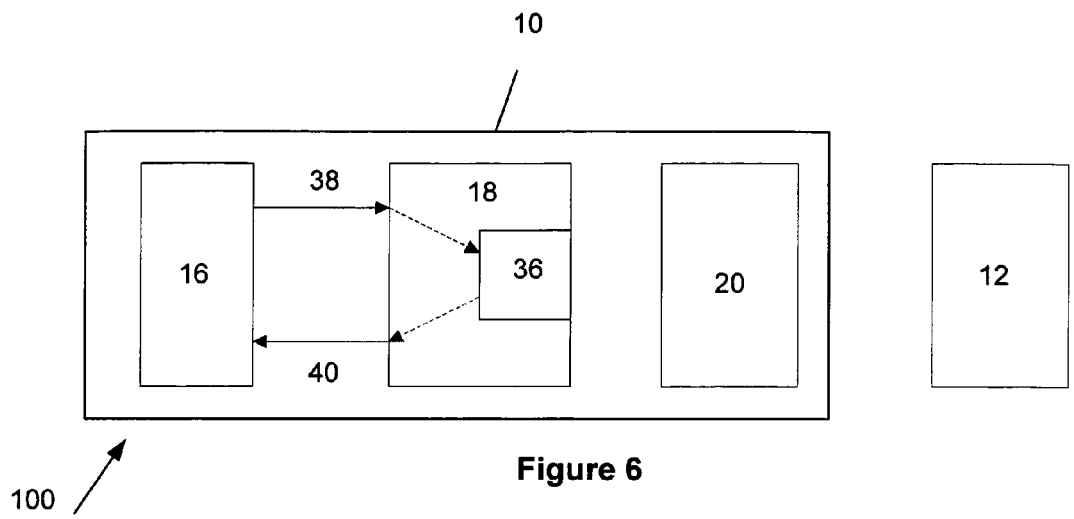
FIG. 6 illustrates a variation for a method for using the revenue management system.

FIG. 6 illustrates a method for accessing a first memory data in the TOC 36. The CM 16 can send, shown by arrow 38, a request to the first data manager 18. The request can apply to the first memory data. The first data manager 18 can analyze the request 38. The first data manager 18 can conclude that the request applies to the first memory. The first data manager 18 can apply or execute the request on the TOC 36. The first data manager 18 can generate a reply and send, shown by arrow 40, the reply to the CM 16.

Figure 7:
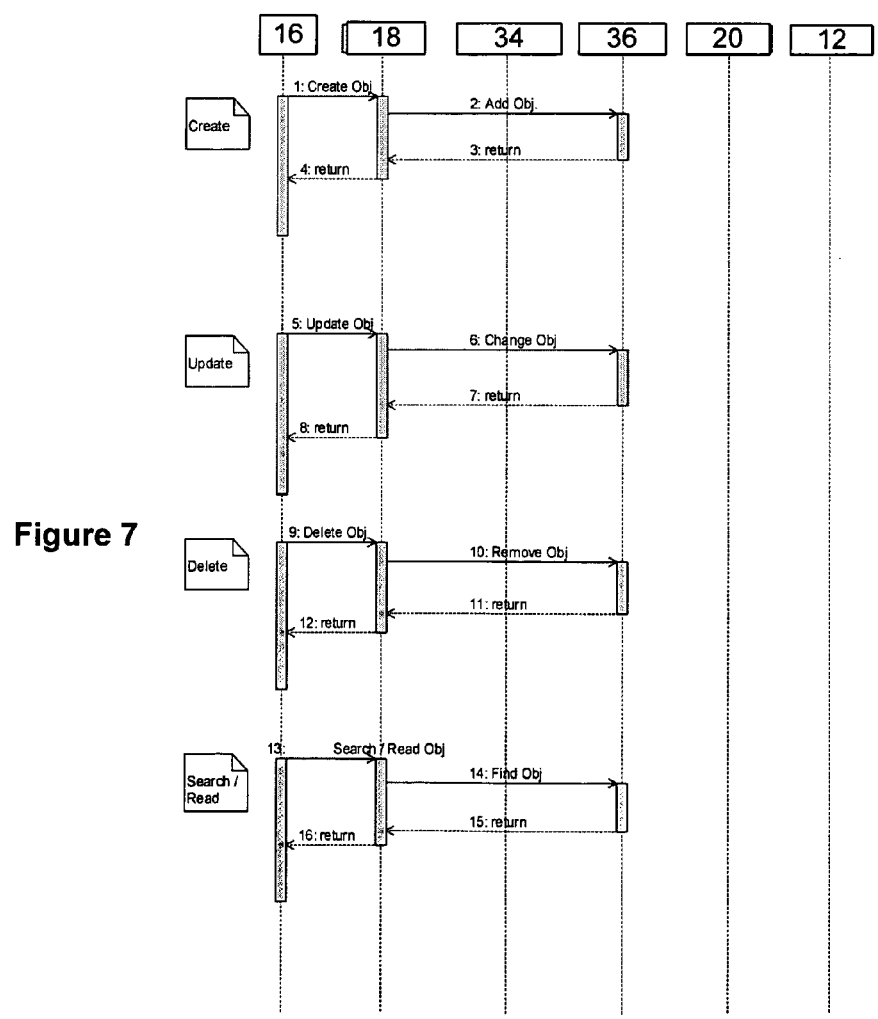
FIG. 7 illustrates process flows for variations for methods for using the revenue management system.

FIG. 7 illustrates flows of various requests from the CM 16 and the replies to the requests. The instructions are shown as create, update, delete and search/read (i.e., query). The request from the CM 16 can be, respectively, create the first data object, update the first data object, delete the first data object, and search/read the first data object. (The numbers of the requests and replies illustrate an exemplary chronological order.) The first data manager 18 can convert or otherwise translate the request from the CM 16 to a first data manager instruction, such as add the first data object, change the first data object, remove the first data object, and find the first data object, respectively. The first data manager 18 can apply or execute the first data manager instruction on the TOC 36. The first data manager 18 can then return a reply. The replies can include the data searched, and/or confirmation that the task was completed successfully, and/or an error code and or error explanation.

Figure 8:
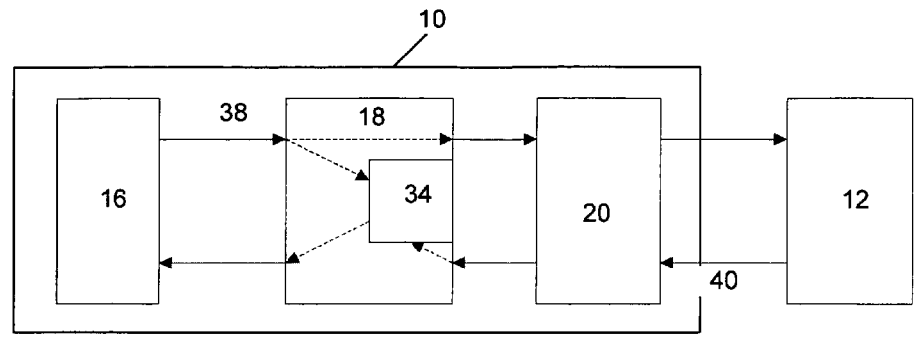
FIG. 8 illustrates a variation for a method for using the revenue management system.

FIG. 8 illustrates a method for accessing high access memory data in the ROC 34 and in the database system 12. The CM 16 can send, shown by arrow 38, a request to the first data manager 18. The request can apply to the high access second memory data. The first data manager 18 can analyze the request 38. The first data manager 18 can conclude that the request applies to the high access second memory data. The first data manager 18 can determine whether the high access second memory data is in the ROC 34. If the first data manager 34 determines that the high access second memory data is in the ROC 34, the first data manager 18 can apply or execute the request on the high access second data in the ROC 34. The first data manager 18 can send the request to the second data manager 20. The second data manager 20 can apply or execute the request on the high access second data in the database system 12. The database system 12 and/or the second data manager 20 and/or the first data manager 18 can generate one or more replies. The replies can be sent, shown by arrow 40, directly or via the first data manager 18 to the CM 16.

Figure 9:
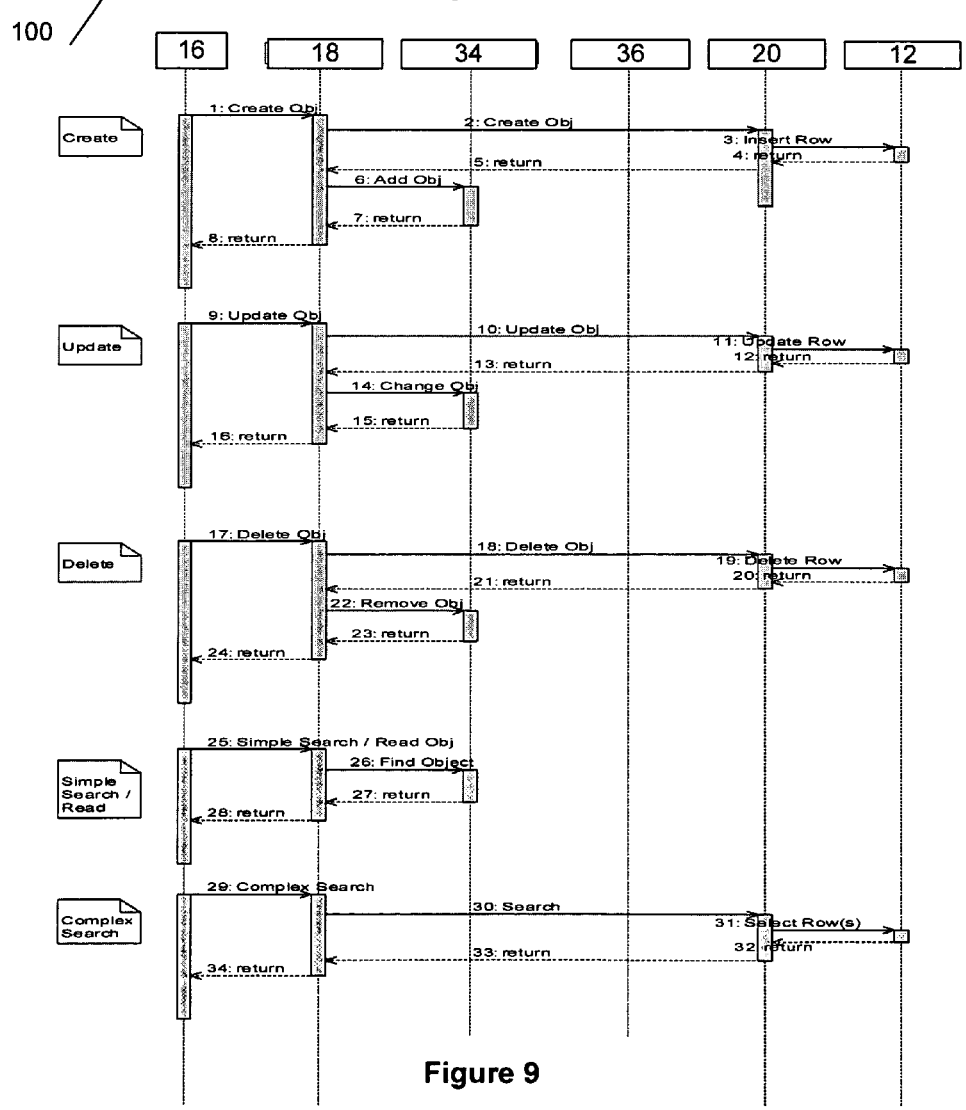
FIG. 9 illustrates process flows for variations for methods for using the revenue management system.

FIG. 9 illustrates flows of various requests from the CM and the replies to the requests. The exemplary instructions are shown as create, update, delete, simple and complex searches/reads (i.e., query). The request from the CM 16 can be, respectively, create the first data object, update the first data object, delete the first data object, and search/read the first data object. (The numbers of the requests and replies illustrate an exemplary chronological order.) The first data manager 20 can convert or otherwise translate the request from the CM 16 to a first data manager instruction, such as add the first data object, change the first data object, remove the first data object, and find the first data object, respectively. The first data manager can then apply or execute the translated request on the high access second data in the ROC 34.

The first data manager 18 can send the request to the second data manager 20 and/or the CM 16 can send the request directly to the second data manager 20. The second data manager 20 can convert or otherwise translate the request to a second data manager instruction, such as insert the row of data, update the row of data, delete the row of data, and select the row or rows of data, respectively (with no response shown for a simple search/read, although the second data manager can perform simple searching). The second data manager 20 can apply or execute the request on the high access second data in the database system 12. The second data manager 20, and/or the database system 12 and/or the first data manager 20 can then return a reply. The replies can include the data searched, and/or confirmation that the task was completed successfully, and/or an error code and or error explanation.

Figure 10:
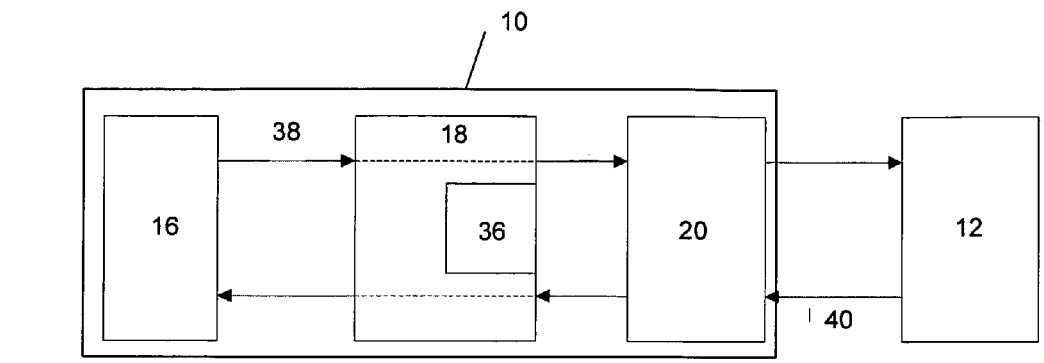
FIG. 10 illustrates a variation for a method for using the revenue management system.

FIG. 10 illustrates a method for accessing low access memory data in the database system 12. The CM 16 can send, shown by arrow 38, a request to the first data manager 18, and/or directly to the second data manager 18. The request can apply to the high access second memory data. The first data manager 18 can analyze the request 38. The first data manager 18 can conclude that the request applies to the low access second memory data. The first data manager 18 can send the request to the second data manager 20. The second data manager 20 can apply or execute the request on the high access second data in the database system 12. The database system 12 and/or the second data manager 20 can generate one or more replies. The replies can be sent, shown by arrow 40, directly or via the first data manager 18 to the CM 16.

Figure 11:
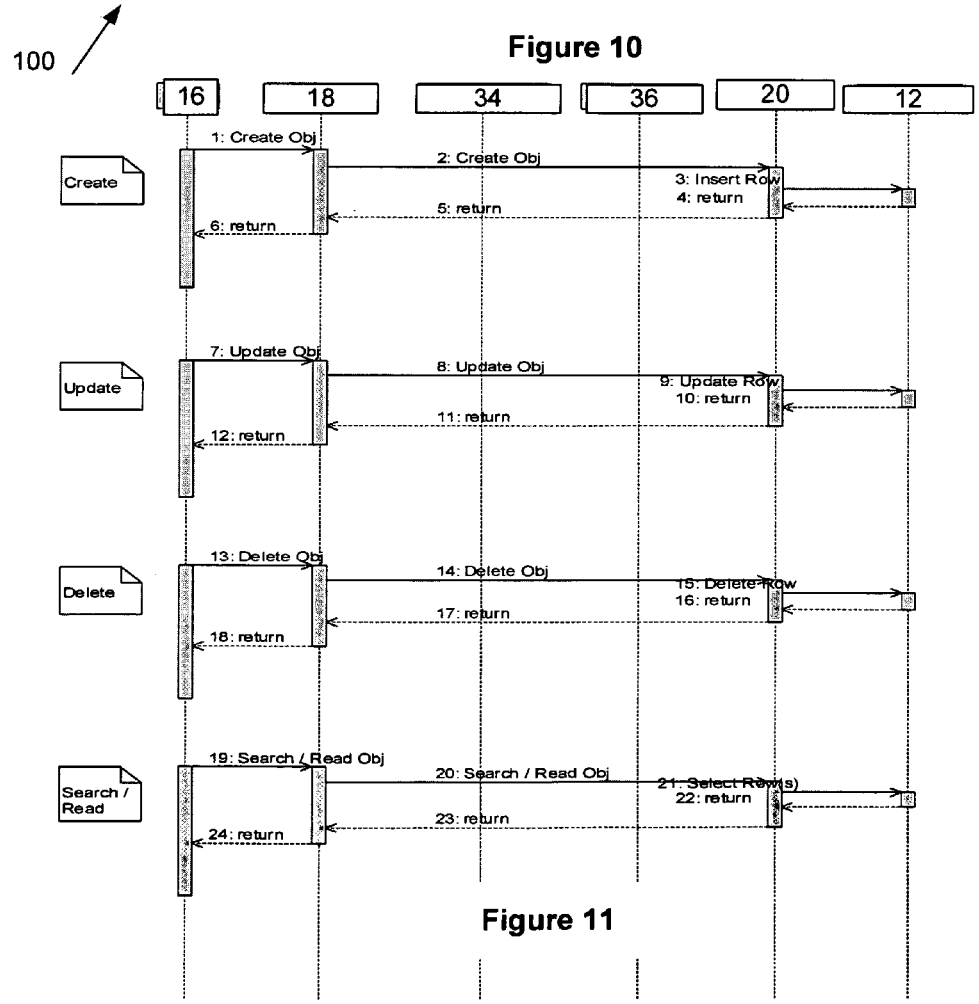
FIG. 11 illustrates process flows for variations for methods for using the revenue management system.

FIG. 11 illustrates flows of various requests from the CM and the replies to the requests. The exemplary instructions are shown as create, update, delete, and searches/read (i.e., query). The request from the CM 16 can be, respectively, create the first data object, update the first data object, delete the first data object, and search/read the first data object. (The numbers of the requests and replies illustrate an exemplary chronological order.) The first data manager 18 can send the request to the second data manager 20. The second data manager 20 can convert or otherwise translate the request to a second data manager instruction, such as insert the row of data, update the row of data, delete the row of data, and select the row or rows of data, respectively. The second data manager 20 can apply or execute the request on the high access second data in the database system 12. The second data manager 20, and/or the database system 12 and/or the first data manager 20 can then return a reply. The replies can include the data searched, and/or confirmation that the task was completed successfully, and/or an error code and or error explanation.

The CM 16 can send requests directly to the desired data manager 18 or 20 and/or the CM 16 can tag the request and the first data manager 18 can analyze the tag to determine whether to apply and/or execute the request and/or whether to send the request to the second data manager. The tag can be the substance of the request (i.e., the requested action) and/or additional data solely to communicate the desired final location of the request.

The first memory data objects of this category can be created, updated or deleted in the high-speed access path of the revenue management system 100. Examples of the first memory data objects include active session objects and resource reservation objects.

The first memory data objects can be analyzed using, for example, logical predicates (e.g., equals, not equals). Queries executed on first memory data can specify an index to use to satisfy the query. The index can be a hash to enable fast value lookup. The index can be a single column index. Predicates on other columns can be supported by filtering the result set to find matches.

Requests for the first memory data objects can be passed to a standard heap memory area. The requests can be created, changed and deleted within transactions.

The first memory data objects can be limited to particular object, such as business object types.

The high access second memory data objects can be accessed only in a read-only mode in the high-speed access path. An example of the high access second memory data objects is customer account information.

The ROC 34 can be filled on demand. This means that requests can be redirected to the database system 12 if the high access second memory data object is not found in the ROC 34. If the request is a read of an entire object, the ROC 34 can be filled or cached by the reply (e.g., as the reply passes through the first data manger 18 on the reply's route back to the CM 16 from the second data manager 20). Partial object requests ('read_fields') of the high access second memory data objects can be cached in a similar manner to that performed for the entire object.

The high access second memory data objects can be fully queried. Simple queries involving basic logical operators (e.g., equals, not equals) can be performed by the first data manager 18 on the high access second memory data objects in the ROC 34. Complex queries (e.g., involving joins to other objects, or operators such as 'like' or 'in') can be performed by the second data manager 20 on the high access second memory data objects in the database system 12.

The dynamic high access second memory data objects can be loaded by the data migrator 30 after a failover.

The static high access second memory data objects can be loaded by the data migrator 30 immediately after the backup first memory system has been started. The static high access second memory data objects can be synchronized with the database via the first memory synchronization system.

The low access second memory data objects can be absent from the first memory. Requests for the low access second memory data objects can be routed directly from first data manager 18 to the second data manager 20. The low access second memory data objects can be fully queried.

The first data manager can allow reading of the first data values during a write operation. The first data manager can have the write operation take place on a scratchpad of data that is only visible to the writing transaction. The first data manager can serialize the first data while the update is moved to main memory at the commit time.

The first data manager can have a read committed isolation. The read committed isolation makes all committed updates available to transactions even if the commit takes place after the transaction is started. Read committed isolation can prevent "dirty" reads (i.e., the first data manager preserves the earlier first data value for reading during pending changes to the first data value).

The first data manager can support or not support statement or transaction level consistent reads.

The revenue management system 100 can be configured to route any traffic not related to session handling can be routed to and/or away from the first memory data manager 18. A synchronization system can be used to send updates to the first memory data manager 18. The synchronization system can automatically propagate changes affecting objects stored in the first memory to all the first memory instances caching the particular object or object type.

The revenue management system 100 can have a convergence system. The convergence system can load batch data via the first data manager 18 into the revenue management system 100, for example, to share any data of batch origin, such as balances between prepaid and postpaid accounts.

The data capacity of a first memory instance can be lower than data the capacity of a second memory (e.g., database) instance. One second memory instance can support several shared-nothing instances of the first memory. (The commonly used term is m:n (m—first memory instances/n—second memory instances)).

The first memory data manager 18 can reduce the latency for objects first memory data manager 18 handles, and at the same time enabling increased throughput of the system 100.

For installation of first memory data manager 18, the first memory data manager 18 can be configured to be inserted between the CM 16 component and second memory data manager 20 component. The introduction of the first memory data manager 18 can change the access characteristics of some object types for a pre-existing revenue management system that did not have the first memory data manager 18. Installation of the first memory data manager 18 can be configured to be transparent (e.g., not change object types). The system 100 can be configured so that the higher-level business logic architecture layers cannot tell first memory data manager 18 is present. However, the business logic can be changed to utilize the first memory data manager 18. These changes can be ignored by the system 100 if the first memory data manager 18 is not present.

The first memory data manager 18 can be installed in an existing revenue management system. For example, the first memory data manager 18 can be physically installed (e.g., mounting hardware and/or loading software onto the appropriate computer-readable medium) and the base software can be configured.

After the installation of the base software, the first data can then be migrated into the first memory data manager 18. The first memory data object residencies stored in the data dictionary can take effect, loading the first data onto the first data manager 18 during use. The residencies can be part of the default business logic module 10 installation (having no effect when the first memory data manager 18 is not present) or can be loaded onto the business logic module 10 during the installation of the first memory data manager 18.

Reference objects can be migrated by loading into the first data manager 18 when accessed for the first time and/or pushed into the first memory data manager 18 by the data migratory 30.

Data objects can be redefined as first memory data objects (or low access or high access second memory data objects) by deploying the data object via the normal mechanism, and then updating the residency type in the data dictionary.

After a process startup, the first memory data manager 18 can have an empty ROC 34. A separate data migration thread can push all high access second memory data in the ROC 34. The static high access second memory data objects can be loaded into the ROC 34. For example, a first memory data manager 18 in backup mode can load only the static high access second memory data objects into the ROC 34.

The data migrator 30 can provide a notification hook to signal the end of the migration and/or startup phase to other processes. The first memory data manager 18 can be operational immediately after start (e.g., before the migratory tool sends the notification hook), for example, with an empty cache. The first request after startup for a specific first data object can trigger that first data object to be loaded into the cache (e.g., if the data migrator 30 has not yet loaded the desired first data object already).

Upon a system shutdown, the first data manager 18 can close the process log file, and release used memory. The high access second memory data objects can be unaffected by shutdown (e.g., remaining stored on the second memory).

The revenue management system 100 can provide hooks to verify and monitor performance. The revenue management system 100 can log performance data on a regular basis and/or make performance data available via an embedded web server. A signal can be sent to the second memory data manager to collect desired data (e.g., for some parts of the system).

The revenue management system 100 can create system logs that can monitor operation of the revenue management system 100. A log monitoring GUI (e.g., Pipeline log viewer) can be used. Business logic style pin-logging can, for example, aid debugging and diagnosis.

The first memory data manager 18 can have a pipeline framework tracing model. Additional trace information can be collected from subsystems of the revenue management system 100 on a case by case basis.

Figure 12A:
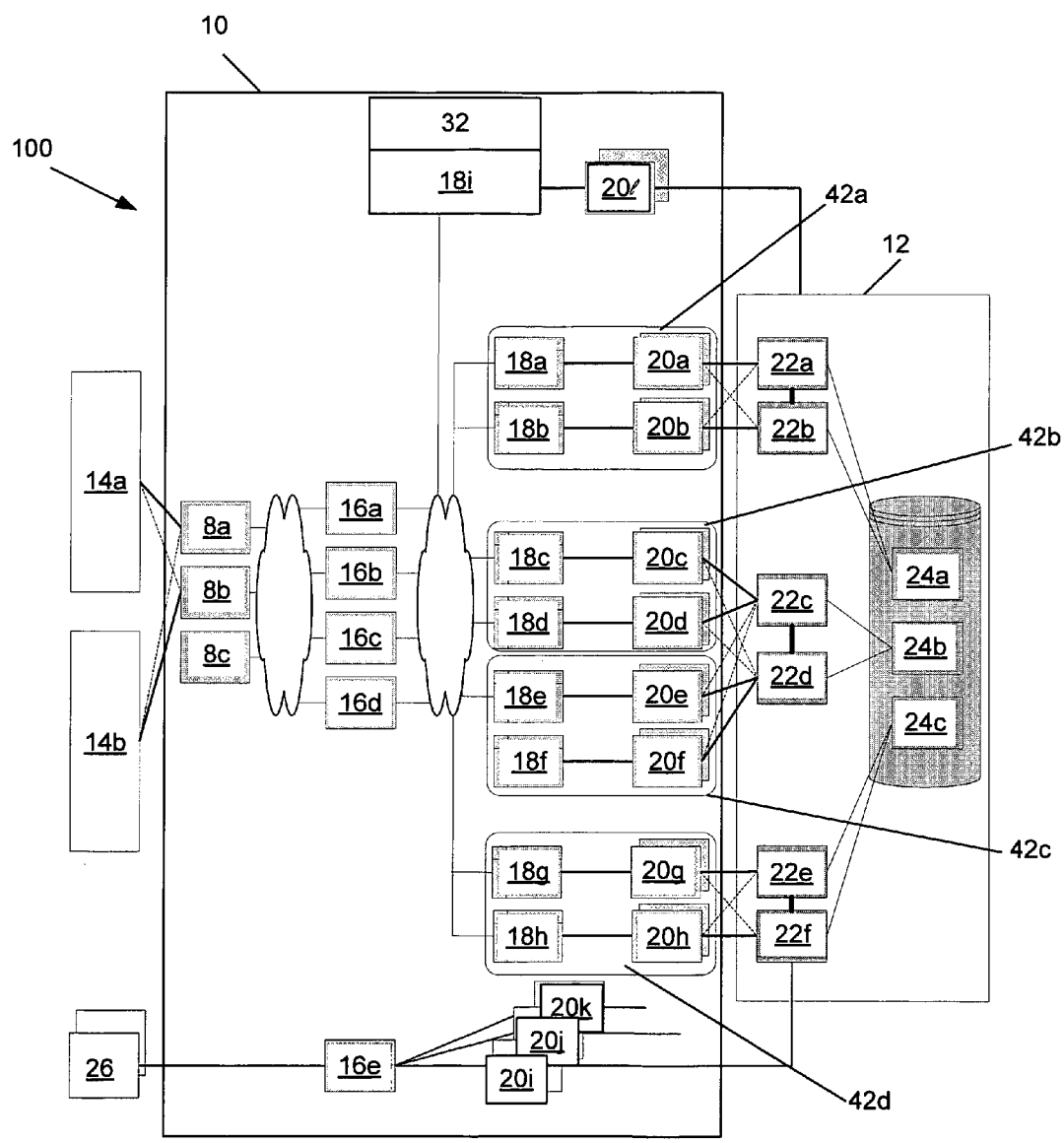
FIGS. 12a through 14 illustrate variations of the revenue management system.
Figure 12B:
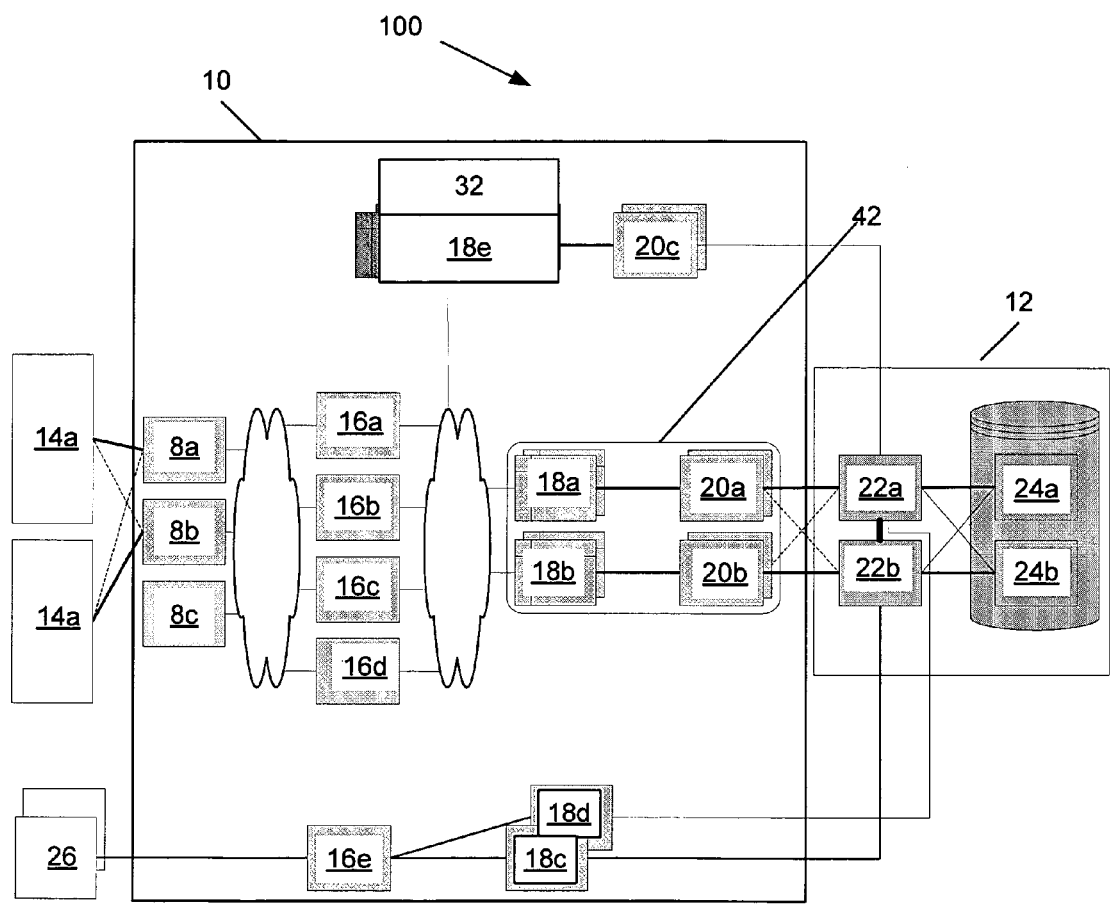
Figure 12C:
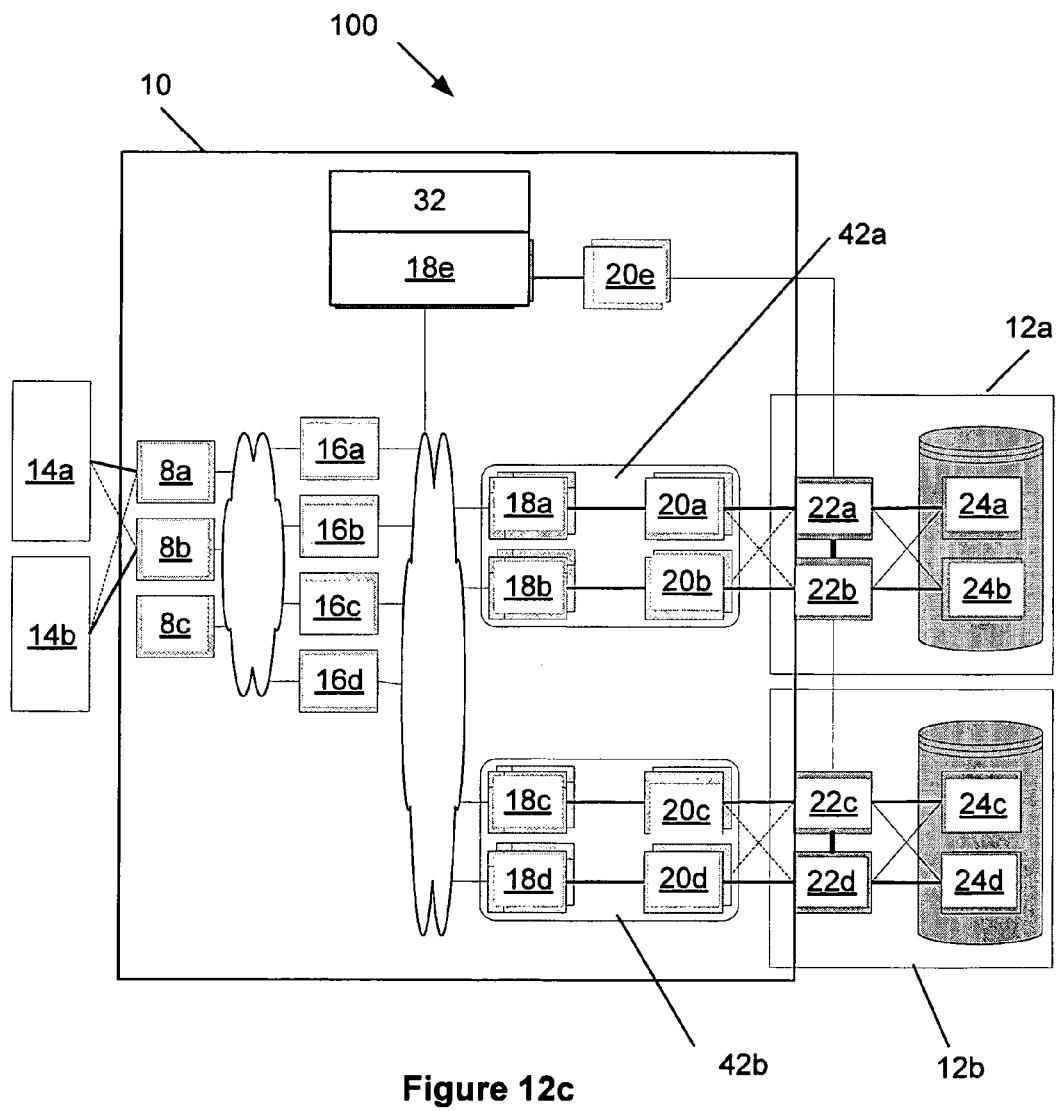

FIGS. 12a, 12b and 12c illustrate that the revenue management system 100 can be scalable to large scale expansion.

The revenue management system 100 can have multiple second memory locations (e.g., databases 24a, 24b and 24c). The revenue management system 100 can have separate instances of the first memory data manager 18a-18i, and the second memory data manager 20a-20l. Pairs of sets of first memory data managers and second memory data manager, for example, 18a, 18b, 20a, and 20b can be formed into high availability (HA) pairs 42. The HA pairs 42 can have active and backup first data managers 18a and 18b, respectively, for example, and active and backup second data managers 20a and 20b, respectively, for example.

The revenue management system 100 can have a capacity partitioning scheme.

Each second memory (e.g., database 24) instance can be associated (i.e., in communication) with one or more first memory data manager 18 instances. The revenue management system can be configured so no data is stored in overlapping second memory instances (n Timos instances: 1 database). The business logic module can have several, independent databases (m). The combination of TIMOS/databases can be referred to as m:n configuration.

The CM 16a-16e can lookup in the directory server 32 to identify the first memory data manager 18 and second memory data manager 20 (or database 24) combination applicable for a certain object.

The revenue management system 100 can have account migration tools. The account migration tools can move subscriber data from one first and/or second memory location (e.g., database 24 and/or first memory data manager 18) to another first and/or second memory location.

Multiple second memory data managers 20 can communicate with the same database clusters 22. All the databases can be managed with one database cluster 22 (e.g., one RAC cluster) (not shown).

The SCPs 14, gateways 8 and CMs 16 can each be associated to multiple first memory data managers 18. The gateway 8 can support load balancing over several CMs 16. The CMs 16 can use the directory server 32 to route the requests to the correct first memory data managers 18.

The database system 12 can run multiple database schemes in one RAC cluster 22. The revenue management system 100 can be configured to associate a dedicated set of resources to just one SCP 14 or group of SCPs 14.

FIG. 12b illustrates that the first memory data managers 18c and 18d can communicate directly with the database system 12, for example with the database clusters 22a and 22b.

FIG. 12c illustrates that the revenue management system can have two or more database systems 12a and 12b.

Figure 13:
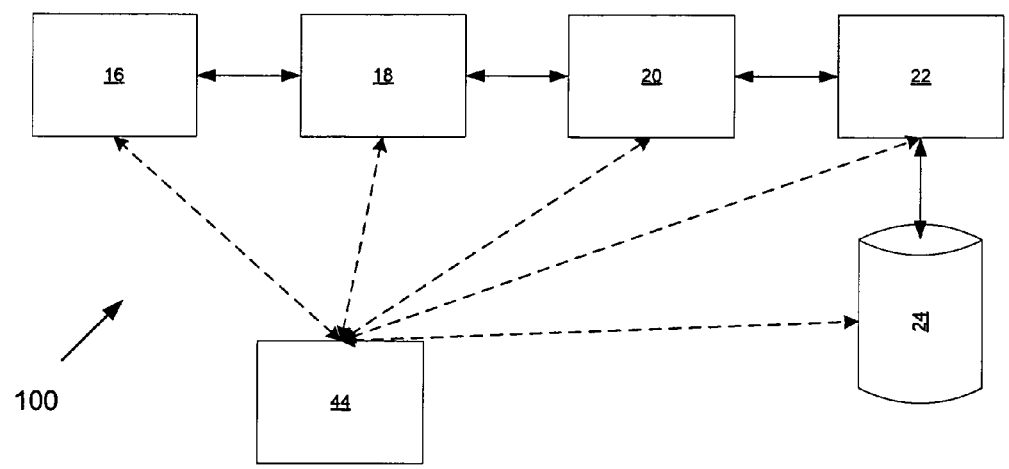

FIG. 13 illustrates a failure protection scheme with a high availability monitor 44 regularly checking the status of the control manager, the first memory in the first memory data manager 18, the second memory data manager 20, the database cluster, and the database 24.

Figure 14:
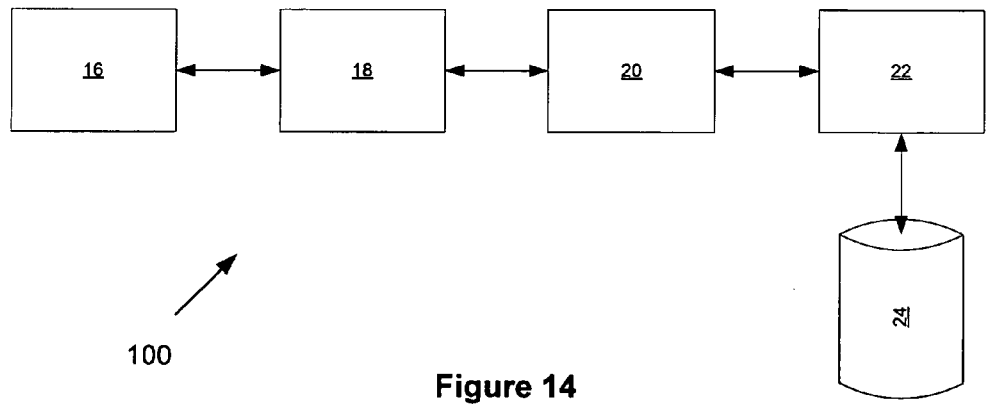

FIG. 14 illustrates a self-contained failure protection system. Each component of the revenue management system 100 can check on the status of its immediately downstream component (e.g., the second memory data manager 20 is immediately downstream of the first memory data manager 18). If the immediately downstream component has failed, or is sending a failure message regarding a further downstream component failure, the revenue management system can take appropriate action, including alerting a user that a failure has occurred. The revenue management system 100 can be absent of a separate monitor component checking for system failures.

The revenue management system 100 can have a high availability. The revenue management system 100 can have a warm standby operation by referring to any data remaining in the first memory (e.g., TIMOS). During warm standby, in the case of a loss of data (e.g., during a system failure), the revenue management system 100 can recreate data from the switch 6 and/or the first memory when the switch 6 sends re-authorization data (e.g., during long calls) or end-of-call data. The database system 24 can store the latest static high access second memory data before a loss of data. The static high access second memory data can be recovered to the first memory from the database system 24 after a loss of data in the first memory.

In the revenue management system 100, higher layers (i.e., more stable during a system failure, such as the database) of architecture with very high availabilities can partially or completely backup lower layers (i.e., less stable during a system failure, such as a solid state RAM variation of the first memory) with lesser availabilities in case of failures.

The revenue management system 100 can have spare, unused hardware and software such as backup data managers in the high availability pairs 42, as shown in FIGS. 12a through 12c. The high availability pair 42 can have active and a backup first data managers 18 and active and backup second data managers 20. The backup data managers can copy from the respective active data managers, for example during a period of no other activity with the active data manager and/or from a sketchpad, and/or the last available data from the active data manager. In case of failure of an element, the backup or other inactive elements will be able to restore data and/or take over the additional load.

U.S. patent application Ser. No. 10/394,409 filed 21 Mar. 2003, and U.S. patent application Ser. No. 11/478,558 filed 28 Jun. 2006 are incorporated by reference herein in their entireties.

Accessing can include querying, updating, creating, deleting and combinations thereof. Querying, updating, creating, and deleting for any data can be interchanged with each other as disclosed.

It is apparent to one skilled in the art that various changes and modifications can be made to this disclosure, and equivalents employed, without departing from the spirit and scope of the invention. System and architecture are used as interchangeable terms, both referring to one or more hardware and software components in communication. All elements shown herein can be software and/or hardware components. Elements shown with any embodiment are exemplary for the specific embodiment and can be used on other embodiments within this disclosure.

We claim:

1. A computer-based telecommunications network account management system comprising:
    a first memory having a first memory access speed and storing one or more transient objects related to a communication on the telecommunications network, wherein the first memory manages the transient objects per communication and wherein the transient objects are not persisted;
    a second memory having a second memory access speed and storing one or more reference objects related to the communication, wherein the second memory persists the reference objects; and
    a first memory manager configured to route a first request for a first object to the first memory, and configured to route a second request for a second object not to the first memory, wherein the first memory has a faster access speed than the second memory, wherein routing the first request for the first object to the first memory and routing the second request for the second object to the second memory are performed based on an object type for each of the first object and the second object and wherein the object types for the first object and the second object are defined in a user defined data dictionary stored in the second memory and wherein the data dictionary stores a user defined object type for the first object and a user defined object type for the second object.

2. The system of claim 1, further comprising a second memory manager configured to route the second object to the second memory.

3. The system of claim 1, wherein the second memory comprises a hard drive.

4. The system of claim 1, wherein the first memory comprises solid state memory.

5. The system of claim 1, wherein the first memory comprises Random Access Memory (RAM).

6. The system of claim 1, wherein the second memory comprises a relational database.

7. The system of claim 1, further comprising a database cluster.

8. The system of claim 1, further comprising a gateway configured to interface with a telecommunications network.

9. The system of claim 1, wherein the first request comprises a query.

10. The system of claim 9, wherein the second request comprises a query.

11. The system of claim 1, wherein the first request comprises a request to write.

12. The system of claim 11, wherein the second request comprises a request to write.

13. The system of claim 1, wherein the object type for the first object comprises a transient object.

14. The system of claim 13, wherein the object type for the second object comprises a reference object.

15. A method for managing a telecommunications network account, the method comprising:
    storing in a first memory having a first memory access speed one or more transient objects related to a communication on the telecommunications network, wherein the first memory manages the transient objects per communication and wherein the transient objects are not persisted;
    storing in a second memory having a second memory access speed one or more reference objects related to the communication, wherein the second memory persists the reference objects;
    routing by a first memory manager a first request for a first object to the first memory; and
    routing by the first memory manager a second request for a second object not to the first memory,
    wherein the first memory has a faster access speed than the second memory, wherein routing the first request for the first object to the first memory and routing the second request for the second object to the second memory are performed based on an object type for each of the first object and the second object and wherein the object types for the first object and the second object are defined in a user defined data dictionary stored in the second memory and wherein the data dictionary stores a user defined object type for the first object and a user defined object type for the second object.

16. The method of claim 15, further comprising routing by a second memory manager the second object to the second memory.

17. The method of claim 15, wherein the second memory comprises a hard drive.

18. The method of claim 15, wherein the first memory comprises solid state memory.

19. The method of claim 15, wherein the first memory comprises Random Access Memory (RAM).

20. The method of claim 15, wherein the second memory comprises a relational database.

21. The method of claim 15, wherein the first request comprises a query.

22. The method of claim 21, wherein the second request comprises a query.

23. The method of claim 15, wherein the first request comprises a request to write.

24. The method of claim 23, wherein the second request comprises a request to write.

25. The method of claim 15, wherein the object type for the first object comprises a transient object.

26. The method of claim 25, wherein the object type for the second object comprises a reference object.

27. A computer-readable memory having stored thereon a sequence of instruction which, when executed by a processor, cause the processor to manage a telecommunications network account by:
    storing in a first memory having a first memory access speed one or more transient objects related to a communication on the telecommunications network, wherein the first memory manages the transient objects per communication and wherein the transient objects are not persisted;
    storing in a second memory having a second memory access speed one or more reference objects related to the communication, wherein the second memory persists the reference objects;
    routing by a first memory manager a first request for a first object to the first memory; and
    routing by the first memory manager a second request for a second object not to the first memory,
    wherein the first memory has a faster access speed than the second memory, wherein routing the first request for the first object to the first memory and routing the second request for the second object to the second memory are performed based on an object type for each of the first object and the second object and wherein the object types for the first object and the second object are defined in a user defined data dictionary stored in the second memory and wherein the data dictionary stores a user defined object type for the first object and a user defined object type for the second object.

28. The computer-readable memory of claim 27, further comprising routing by a second memory manager the second object to the second memory.

29. The computer-readable memory of claim 27, wherein the second memory comprises a hard drive.

30. The computer-readable memory of claim 27, wherein the first memory comprises solid state memory.

31. The computer-readable memory of claim 27, wherein the first memory comprises Random Access Memory (RAM).

32. The computer-readable memory of claim 27, wherein the second memory comprises a relational database.

* * * * *

UNITED STATES PATENT AND TRADEMARK OFFICE
CERTIFICATE OF CORRECTION

PATENT NO. : 8,117,358 B2  
APPLICATION NO. : 11/496057  
DATED : February 14, 2012  
INVENTOR(S) : Labuda et al.

Page 1 of 1

It is certified that error appears in the above-identified patent and that said Letters Patent is hereby corrected as shown below:

On front page, in column 2, under "Abstract", line 4, delete "real time" and insert -- real-time --, therefor.

On page 3, in column 2, under "Other Publications", line 34, delete "Standasrds"," and insert -- Standards", --, therefor.

In column 1, line 9, delete "2005" and insert -- 2005, --, therefor.

In column 3, line 51, delete "be-software" and insert -- be software --, therefor.

In column 5, line 6, delete "DM-Oracle)," and insert -- DM_Oracle), --, therefor.

In column 7, line 10, delete "and or" and insert -- and/or --, therefor.

In column 7, line 60, delete "and or" and insert -- and/or --, therefor.

In column 8, line 27, delete "and or" and insert -- and/or --, therefor.

Signed and Sealed this
First Day of May, 2012

David J. Kappos
*Director of the United States Patent and Trademark Office*